(12) United States Patent
Won

(10) Patent No.: US 11,947,843 B2
(45) Date of Patent: Apr. 2, 2024

(54) METHOD FOR PROCESSING A CACHE BARRIER COMMAND FOR A DISK ARRAY AND DEVICE FOR THE SAME

(71) Applicant: KOREA ADVANCED INSTITUTE OF SCIENCE AND TECHNOLOGY, Daejeon (KR)

(72) Inventor: Youjip Won, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 17/268,643

(22) PCT Filed: Nov. 26, 2020

(86) PCT No.: PCT/KR2020/017000
§ 371 (c)(1),
(2) Date: Feb. 16, 2021

(87) PCT Pub. No.: WO2021/172708
PCT Pub. Date: Sep. 2, 2021

(65) Prior Publication Data
US 2022/0188044 A1    Jun. 16, 2022

(30) Foreign Application Priority Data
Feb. 25, 2020   (KR) .................. 10-2020-0022917

(51) Int. Cl.
*G06F 3/06*   (2006.01)
(52) U.S. Cl.
CPC .......... *G06F 3/0689* (2013.01); *G06F 3/0604* (2013.01); *G06F 3/0655* (2013.01)

(58) Field of Classification Search
CPC ..... G06F 3/0689; G06F 3/0604; G06F 3/0655
See application file for complete search history.

(56) References Cited

U.S. PATENT DOCUMENTS

| 5,530,948 A | 6/1996 | Islam |
| 11,023,318 B1 * | 6/2021 | Volkov ................ G06F 16/1805 |

(Continued)

FOREIGN PATENT DOCUMENTS

| CN | 101334708 A | 12/2008 |
| CN | 110033799 A | 7/2019 |

(Continued)

OTHER PUBLICATIONS

Youjip Won, et al. "Barrier-Enabled IO Stack for Flash Storage" This paper is included in the Proceedings of the 16th USENIX Conference on File and Storage Technologies. Feb. 12-15, 2018 • Oakland, CA, USA.

*Primary Examiner* — Nanci N Wong
(74) *Attorney, Agent, or Firm* — Stuart H. Mayer; Kaplan Breyer Schwarz LLP

(57) ABSTRACT

Provided is a method of controlling a RAID controller, the method including generating, by the RAID controller, a command sequence, and transmitting, by the RAID controller, when a first cache barrier command included in the command sequence is identified, at least one cache barrier command to an arbitrary disk constituting a RAID before transmitting a first write command arranged after the first cache barrier command in the command sequence to the arbitrary disk.

13 Claims, 18 Drawing Sheets

(56) References Cited

U.S. PATENT DOCUMENTS

| | | | |
|---|---|---|---|
| 2008/0120463 A1* | 5/2008 | Ashmore | G06F 3/0613 |
| | | | 711/E12.001 |
| 2009/0006787 A1 | 1/2009 | De Souza et al. | |
| 2014/0059270 A1* | 2/2014 | Zaltsman | G06F 3/0623 |
| | | | 711/E12.008 |
| 2016/0259687 A1* | 9/2016 | Yoshihara | G06F 11/1076 |
| 2017/0031769 A1* | 2/2017 | Zheng | G06F 3/0683 |
| 2017/0075781 A1* | 3/2017 | Bennett, Jr. | G06F 3/0619 |
| 2020/0104257 A1* | 4/2020 | Lee | G06F 3/0689 |
| 2021/0096766 A1* | 4/2021 | Kotzur | G06F 3/067 |

FOREIGN PATENT DOCUMENTS

| | | |
|---|---|---|
| JP | 1997-305330 | 11/1997 |
| JP | 2019-125366 | 7/2019 |
| KR | 10-2019-0096838 | 8/2019 |

* cited by examiner

FIG. 8
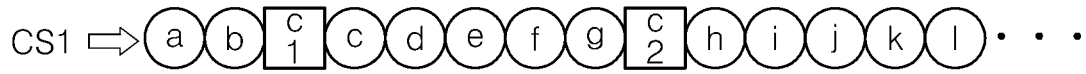
FIG. 8A
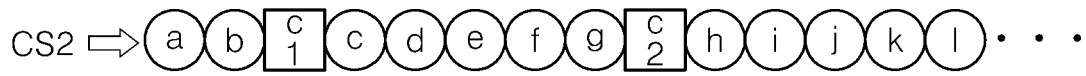
FIG. 8B
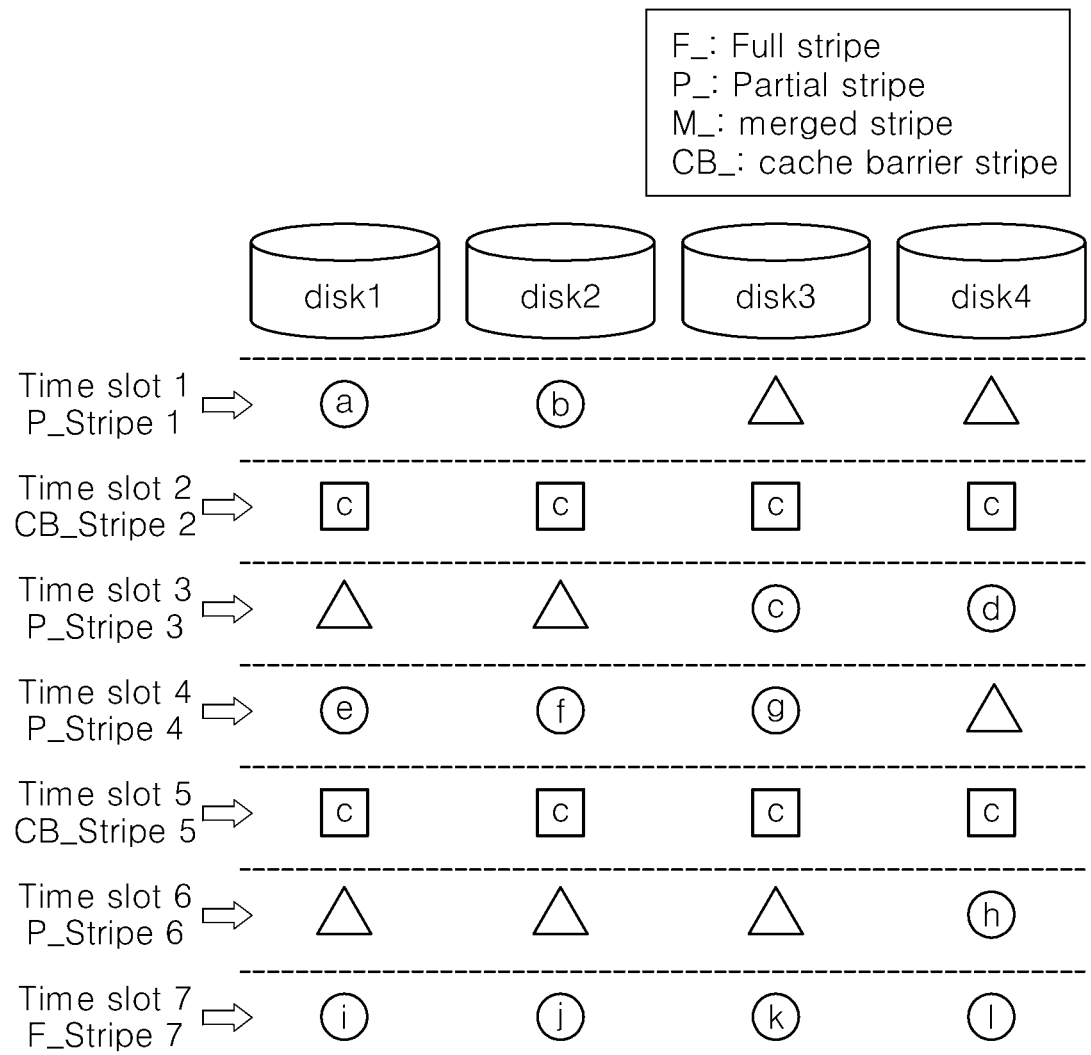
FIG. 8C

METHOD FOR PROCESSING A CACHE BARRIER COMMAND FOR A DISK ARRAY AND DEVICE FOR THE SAME

CROSS-REFERENCE TO RELATED APPLICATION

This application claims priority to Korean Patent Application No. 10-2020-0022917 filed on Feb. 25, 2020, and all the benefits accruing therefrom under 35 U.S.C. § 119, the contents of which are incorporated by reference in their entirety.

BACKGROUND

The present disclosure relates to a computer technology, and more particularly, to a technology for controlling RAID.

Disk Array

RAID (Disk Array) is a method of configuring a large-capacity disk by connecting multiple disks in parallel, and is used for the purpose of increasing performance of read and write operations.

When a RAID controller serves a write command, the RAID controller collects blocks transferred from a host and writes the collected blocks to the multiple disks constituting the disk array in a specific unit, for example, in a block unit or an integer multiple of a block. Since each disk constituting the disk array operates independently, the RAID controller can write the collected blocks to the multiple disks in parallel.

A set of blocks that are written to the disks constituting the disk array one at a time is called a stripe.

One stripe is composed of multiple data blocks, or multiple data blocks and one or more code blocks having recovery information for these data blocks. The code block store information that can recover contents of data blocks stored on a damaged disk when the disk is damaged. For example, the code block may include parity of data blocks existing in one stripe.

The size of one stripe is (size of block used for one stripe)×(number of blocks). Assume a disk array of RAID 0 (zero) type composed of four disks. If a write unit to be written for each disk in one stripe is one block, the size of one stripe is four blocks.

For example, if eight blocks are to be written to a disk array, these blocks are written to four disks in units of stripe sizes. If block a, block b, block c, block d, block e, block f, block g, and block h are written to four disks, {block a, block b, block c, block d} constructs one stripe and {block e, block f, block g, block h} constructs another stripe.

If the write unit to be written for each disk in one stripe is two blocks, the size of one stripe is eight blocks. In this time, if the eight blocks described above are written to the same RAID 0, {a,b}, {c,d}, {e,f}, and {g,h} are written to each disk.

The disk controller transfers a write request to each disk while ensuring a write order between stripes.

Configuration of Stripe

In a parity-based RAID, one stripe composed of N blocks is composed of (N-m) data blocks and m parity blocks. For RAID 0, m=0. For RAID 4 or RAID 5, m is 1. For RAID 6, m=2.

Stripe Write

A process of writing blocks transferred from a host is as follows.

First, the RAID controller constructs a stripe.

Next, the RAID controller sends a write request to each disk in order to distribute and write blocks belonging to one stripe across respective disks. Each disk processes the received write request. That is, blocks specified in the write request are received on the disk. Here, "receiving" means that the blocks are transferred to a buffer inside the disk.

When all the blocks constituting the stripe are transferred to the disks constituting the disk array, the RAID controller proceeds writing of next stripe in the same manner.

In the case of RAID 0, one stripe is composed of only the data blocks. In RAID 5, a stripe is composed of data blocks and one parity block. In the case of RAID 6, the stripe is composed of data blocks and two parity blocks.

Cache Barrier Command

The cache barrier command is a command for storage device defined on a single disk. In eMMC 5.0, this command is defined as standard.

Commands that arrive at one disk can be divided into commands that already exist on the disk before the cache barrier command arrives, and commands that arrive on the disk after the cache barrier command.

A storage controller that is compatible with or support the cache barrier command ensures that blocks to be written by write commands that already exist on the disk before the arrival of the cache barrier command are permanently written before blocks to be written by write commands that arrive on the disk after the arrival of the cache barrier command.

For example, assume that command arrives on the disk in the order of write(A), write(B), cache barrier, write(C), and write(D). Here, write( ) is a write command for the block in ( ), and cache barrier described above is a cache barrier command. A disk controller supporting the cache barrier command ensures that blocks C and D are safely written after blocks A and B are safely written based on the point in time when the cache barrier command is received. The purpose of the cache barrier command is to specify the ultimate write order between write commands.

On the other hand, the disk controller that does not support the cache barrier command may not satisfy the condition required by the cache barrier command even if the disk controller receives the cache barrier command.

Disk Array and Cache Barrier Command

When a command arrives from the host to the RAID controller, the RAID controller processes the command. The blocks specified in the write command are transmitted from the host to the RAID storage device. Blocks received by the RAID controller are constructed in stripes according to a rule defined by the RAID controller, and then distributed and stored among disks constituting a disk array.

In RAID 0, blocks existing in the RAID controller are stored in the disks constituting RAID 0 in units of stripe sizes. A RAID 0 controller allocates the data blocks of the stripe to the disks constituting the stripe according to a predefined size (size unit in the stripe).

Storing blocks stored in memory on the RAID storage device on the disks that constitute the RAID is done by sending a write command to each disk by the RAID controller.

A RAID 5 controller generates parity for data blocks that belong to one stripe, and then writes the data blocks and the parity block to respective disks constituting the disk array.

There are various other RAID methods. In all of these RAID methods, a single stripe is composed of multiple data blocks and multiple code blocks (or parity blocks). Writing is done in such a way of writing one stripe to the disks and then writing the next stripe.

The cache barrier command is a command that enforces a write order between a series of write commands arriving on a single disk. That is, the cache barrier command has meaning in a set of commands that arrive on the single disk.

When a plurality of write commands including one cache barrier command are distributed and written to disks constituting a RAID, the one cache barrier command is transferred to only a specific disk. In the specific disk to which the cache barrier command is transferred, a write order between write commands that have arrived before the arrival of the cache barrier command and write commands that have arrived after the arrival of the cache barrier command is maintained.

However, in the disks other than the specific disk to which the cache barrier command is transferred, there is a problem that the write order that the cache barrier command intends to enforce is no longer ensured.

In one embodiment, it may be assumed that a series of commands arriving from the host to the RAID controller are composed of a plurality of write commands and one or more cache barrier commands. When a plurality of data blocks related to the plurality of write commands are distributed and arranged across a plurality of disks, there is a problem that a write order condition intended to be ensured through the one or more cache barrier commands may be broken.

As this example, it can be assumed that, for example, 8 blocks are written. For example, one application program may intend to ensure that {a, b, c, d} is written first and then {e, f, g, h} is written through a cache barrier command. To this end, it can be assumed that the host sends write(a), write(b), write(c), write(d), "cache barrier", write(e), write (f), write(g), and write(h) commands sequentially to the RAID controller. And now, it can be assumed that the RAID is composed of four disks.

In this case, considering the method of handling the blocks in rotation between disks as in the related art, first, write(a), write(b), write(c), and write(d) which are write commands for block a, block b, block c, and block d will be transferred to the disks, respectively, as follows.

Disk 0: write(a)
Disk 1: write(b)
Disk 2: write(c)
Disk 3: write(d)

Then, by write(a), write(b), write(c), and write(d), block a, block b, block c, and block d will be written to the disks, respectively, as follow.

Disk 0: block a
Disk 1: block b
Disk 2: block c
Disk 3: block d

After that, cache barrier which is the cache barrier command will be written to disk 0 as follows.

Disk 0: write(a), cache barrier
Disk 1: write(b),
Disk 2: write(c),
Disk 3: write(d), After that, the write commands write(e), write(f), write (g), and write(h) for block e, block f, block g, and block h will be written to the disks, respectively, as follows.

Disk 0: write(a), cache barrier, write(e)
Disk 1: write(b), write(f)
Disk 2: write(c), write(g)
Disk 3: write(d), write(h)

By write(e), write(f), write(g), and write(h), block e, block f, block g, and block h will be written to the disks, respectively, as follows.

Disk 0: block a, block e
Disk 1: block b, block f
Disk 2: block c, block g
Disk 3: block d, block h In this case, the cache barrier command is provided only to disk 0, and the cache barrier command is not provided to disk 1, disk 2, and disk 3. Accordingly, there is a problem that the order relationship between the blocks b and f written to the disk 1, the blocks c and g written to the disk 2, and the blocks d and h written to the disk 3 is lost in RAID.

SUMMARY

In the present disclosure, when a plurality of write commands with one cache barrier command included in the middle are distributed and written to the disks constituting a RAID, since the one cache barrier command is transferred only to a specific disk, it is intended to deal with the matters that the original write order of the cache barrier command is broken in the remaining disks other than the specific disk.

As a method of dealing with the matters described above, first, when description is made in relation to the example described above, there is a method of writing block a, block b, block c, and block d to respective disks in a durable manner, and then writing the block e, block f, block g, and block h to the respective disks. However, since the next write block is sent after confirming that the block is safely written to the media, performance degradation occurs in this technique.

According to one aspect of the present disclosure, a RAID controller generates a cache barrier stripe composed of cache barrier commands in a point in time when transmitting one cache barrier command to the disk, and distributes and transmits the cache barrier commands constituting the cache barrier stripe to respective disks in the same way that blocks constituting one stripe are distributed to the respective disks to be written thereto.

For example, it can be assumed that commands sent from the host arrive at the RAID storage device in the order of write(a), write(b), write(c), write(d), cache barrier, write(e), write(f), write(g), and write(h).

Block a, block b, block c, and block d have been transmitted to the RAID storage device. Thereafter, in order to transmit these blocks back to the individual disks, write commands for block a, block b, block c, and block d are transferred to the disks, respectively, as follows.

Disk 0: write(a)
Disk 1: write(b)
Disk 2: write(c)
Disk 3: write(d)

Next, before transferring write(e), write(f), write(g), and write(h) commands to be executed after the cache barrier command provided to the RAID storage device to the disks, respectively, the one cache barrier is first transferred to each of the disks. In this way, the number of cache barrier commands corresponding to the number of disks constituting the RAID storage device and write commands for block e, block f, block g, and block h will be written to the disks, respectively, as follows.

Disk 0: write(a), cache barrier, write(e)
Disk 1: write(b), cache barrier, write(f)
Disk 2: write(c), cache barrier, write(g)
Disk 3: write(d), cache barrier, write(h)

In an embodiment according to another aspect of the present disclosure, when the cache barrier command is in the middle of the stripe, the stripe can be divided. That is, consider an array composed of four disks in the case where commands sequentially transferred from the host to the RAID controller are write(a), write(b), cache barrier, write (c), write(d), write(e), cache barrier, write(f), write (g), and write(h).

When there are the cache barriers as described above, the stripes can be constructed as follows.
Stripe 1: block a, block b, dummy block, dummy block
Stripe 2 (barrier stripe): cash barrier, cash barrier, cash barrier, cash barrier
Stripe 3: dummy block, dummy block, block c, block d,
Stripe 4: block e, dummy block, dummy block, dummy block
Stripe 5 (barrier stripe): cash barrier, cash barrier, cash barrier, cash barrier
Stripe 6: dummy block, block f, block g, block h

[Table 1] below illustrates the correspondence relationship between the elements of six stripes described above and the four disks.

TABLE 1

|  | Disk 1 | Disk 2 | Disk 3 | Disk 4 |
| --- | --- | --- | --- | --- |
| Time 1/Stripe 1 | a | b | — | — |
| Time 2/Stripe 2 | barrier | barrier | barrier | barrier |
| Time 3/Stripe 3 | — | — | c | d |
| Time 4/Stripe 4 | e | — | — | — |
| Time 5/Stripe 5 | barrier | barrier | barrier | barrier |
| Time 6/Stripe 6 | — | f | g | h |

In order to explain meaning of the 'dummy block' described above, a concept of 'full stripe' referred to in the present disclosure will be first described. As will be described later, the full stripe means a stripe including the same number of write commands as the total number of disks constituting the RAID. For example, assuming that the total number of disks constituting the RAID is four, one full stripe may be composed of a total of four blocks that actually exist. In [Table 1] above, corresponds to 'dummy block'.

The 'dummy block' described above is a different type of stripe distinguished from the full stripe, and is a concept introduced to easily describe a structure of a partial stripe to be described later according to an embodiment of the present disclosure. The 'dummy block' is a block that does not actually exist, and a write operation for the 'dummy block' also does not occur. Stripe 1 to Stripe 5 presented above represent an example in which the total number of disks constituting the RAID is 4, and among these four disks, the term 'dummy block' is used to distinguish between a disk in which an actual write operation occurs and a block in which the write operation does not occur. For example, in the case of {Stripe 1: block a, block b, dummy block, dummy block} described above, the disks onto which block a and block b are written are the first disk and the second disk, and the disk onto which no writing occurs is the third disk and the fourth disk. Hereinafter, the dummy block presented in the present specification should be interpreted from this perspective.

Stripe 1, Stripe 3, Stripe 4, and Stripe 6 described above correspond to partial stripes according to an embodiment of the present disclosure. According to another embodiment of the present disclosure, two adjacent partial stripes may be merged with each other. A new stripe formed by merging two partial stripes may be referred to as a merged stripe in the present disclosure. For example, Stripe 3 and Stripe 4 adjacent to each other can be merged to be reconstructed into a total of five stripes illustrated in the following [Table 2]. In [Table 2] below, Stripe 3 is a merged stripe.

TABLE 2

|  | Disk 1 | Disk 2 | Disk 3 | Disk 4 |
| --- | --- | --- | --- | --- |
| Time 1/Stripe 1 | a | b | — | — |
| Time 2/Stripe 2 | barrier | barrier | barrier | barrier |
| Time 3/Stripe 3 | e | — | c | d |
| Time 4/Stripe 4 | barrier | barrier | barrier | barrier |
| Time 5/Stripe 5 | — | f | g | h |

On the contrary, when it is assumed that there is no cache barrier in the above example, the above stripes may be composed of only two stripes as illustrated in [Table 3] below.

TABLE 3

|  | Disk 1 | Disk 2 | Disk 3 | Disk 4 |
| --- | --- | --- | --- | --- |
| Time 1/Stripe 1 | a | b | c | d |
| Time 2/Stripe 2 | e | f | g | h |

According to one aspect of the present invention, a method of controlling a RAID controller can be provided. The method comprises,
generating, by the RAID controller, a command sequence; and transmitting, by the RAID controller, when a first cache barrier command included in the command sequence is identified, at least one cache barrier command to an arbitrary disk constituting a RAID before transmitting a first write command arranged after the first cache barrier command in the command sequence to the arbitrary disk.

Here, the command sequence may be generated by reconstructing a first command sequence received from an external host device by the RAID controller according to a RAID level of the RAID controller.

Here, the first command sequence may be transmitted from the external host and received at or by the RAID controller.

Here, the command sequence may include data blocks included in the first command sequence received by the RAID controller from the external host device and a plurality of code blocks generated based on the data blocks.

Here, the command sequence may be received by the RAID controller from an external host device.

Here, the transmitting may comprise constructing, by the RAID controller, a cache barrier stripe, which is a stripe composed of the same number of cache barrier commands as the number of all disks constituting the RAID before transmitting the first write command to the arbitrary disk constituting the RAID.

Here, a total number of the disks constituting the RAID may be N (N is a natural number of 2 or more), and before the transmitting, the method may further comprise: constructing, by the RAID controller, a first type of partial stripe which is a stripe composed of only write commands arranged before the first cache barrier command in the first command array, when it is identified that the first cache barrier command exists in a first command array including N write commands consecutively arranged in the command sequence in a process of obtaining the N write commands from the command sequence in order to construct one stripe.

Here, the method may further comprise: after constructing the first type of partial stripe, transmitting one or more cache barrier commands to the disk constituting the RAID; and constructing a second type of partial stripe, which is a stripe composed of less than N write commands including one write command arranged immediately after the first cache barrier command in the first command array for at least one disk that has not received a write command based on the first type of partial stripe.

Here, the RAID controller may be adapted to construct a merged stripe, which is a single stripe constructed by merging a first partial stripe of the first type or the second type and a second partial stripe of the first type or the second type, and if the single merged stripe is not generated using the first partial stripe and the second partial stripe, the first partial stripe and the second partial stripe are consecutively provided as different stripes.

Here, the RAID controller may be adapted to construct a full stripe, which is a stripe constructed without considering the cache barrier command, the RAID controller is adapted to satisfy a first predetermined correspondence rule for making write commands included in the full stripe correspond to the disks constituting the RAID, the RAID controller is adapted to, when the total number of write commands included in the merged stripe is the same as the total number of disks constituting the RAID, or when the total number of write commands included in the merged stripe is the same as the total number of write commands included in the full stripe, satisfy a second predetermined correspondence rule for making the write commands included in the merged stripe correspond to the disks constituting the RAID, and the first correspondence rule and the second correspondence rule are different to each other.

Here, the first correspondence rule may be a rule for allocating a plurality of first blocks according to an order of the first blocks transferred by the host device when allocating the first blocks to the disks to which order numbers are allocated, and the second correspondence rule may be a rule for allocating a plurality of second blocks in an order different from an order of the second blocks transferred by the host device when allocating the second blocks to the disks to which the order numbers are allocated.

Here, the merged stripe may be constructed only when the sum of the number of write commands included in the first partial stripe and the number of write commands included in the second partial stripe is less than or equal to the total number of the disks constituting the RAID.

Here, a total number of disks constituting the RAID may be N (N is a natural number of 2 or more), before the transmitting, the method may further comprise: constructing, by the RAID controller, a stripe composed only of write commands disposed between two adjacent cache barrier commands, when it is identified that a plurality of cache barrier commands including the first cache barrier command exists in a first command array including N write commands consecutively arranged in the command sequence in a process of obtaining the N write commands from the command sequence in order to construct one stripe.

Here, the command sequence may include one or more parity blocks generated by the RAID controller from blocks included in the first command sequence.

According to other aspect of the present invention, a RAID controller can be provided. The RAID controller is adapted to transmit, when a first cache barrier command included in a command sequence used to generate a stripe is identified, at least one cache barrier command to an arbitrary disk constituting a RAID before transmitting a first write command arranged after the first cache barrier command in the command sequence to the arbitrary disk.

According to another aspect of the present invention, a computing device can be provided. The computing device comprises the above explained RAID controller; and a plurality of disks controlled by the RAID controller; and a host configured to provide a command sequence to the RAID controller.

According to another aspect of the present, as a nonvolatile storage medium that can be read by a RAID controller, a nonvolatile storage medium in which a command set that causes, when the first cache barrier command included in the command sequence used to generate the stripe is identified, the RAID controller to perform transmitting at least one cache barrier command to an arbitrary disk constituting the RAID before transmitting the first write command arranged after the first cache barrier command in the command sequence to the arbitrary disk is recorded, may be provided.

BRIEF DESCRIPTION OF THE DRAWINGS

Exemplary embodiments can be understood in more detail from the following description taken in conjunction with the accompanying drawings, in which:

FIGS. 6A, 6B, 6C, 7A, 7B, 7C, 8A, 8B, 8C, 9A, 9B and 9C are other examples to help understand a concept of a merged stripe and a partial stripe according to an embodiment of the present disclosure;

DETAILED DESCRIPTION OF EMBODIMENTS

Hereinafter, specific embodiments will be described in detail with reference to the accompanying drawings.

Hereinafter, embodiments of the present disclosure will be described in detail with reference to the accompanying drawings. However, the present disclosure is not limited to the embodiments described in the present specification and may be implemented in various forms. The terms used in the present specification are intended to aid understanding of the embodiments, and are not intended to limit the scope of the present disclosure. In addition, the singular forms used below also include plural forms as long as the phrases do not clearly represent the opposite meaning.

Figure 1A:
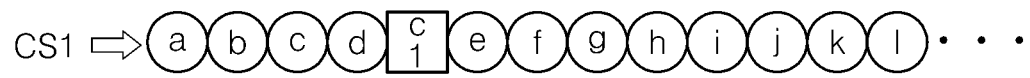
FIG. 1A, FIG. 1B and FIG. 1C are diagrams illustrating a concept of a method of operating a RAID controller according to an embodiment of the present disclosure.
Figure 1B:
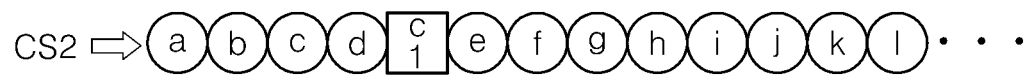
Figure 1C:
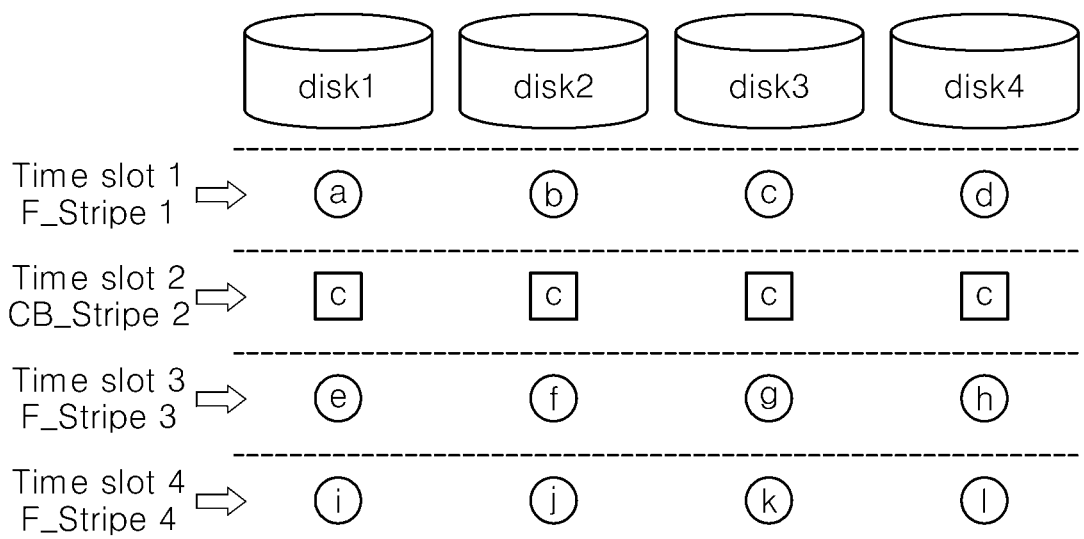

FIG. 1 is a diagram illustrating a concept of a method of operating a RAID controller according to an embodiment of the present disclosure.

A first command sequence cs1 of the part (a) of FIG. 1 illustrates a series of commands transmitted from a host to the RAID controller.

In the present specification, a mark represented by a circle represents a write command for a data block indicated by a character included in the circle. For example, a circle containing a character 'a' is a write command for a data block a. The mark represented by a square represents a cache barrier command.

The first command sequence cs1 includes one cache barrier command c1.

A second command sequence cs2 of the part (b) of FIG. 1 is generated by reconstructing the first command sequence cs1 by the RAID controller. In FIG. 1, since RAID 0 is assumed, a separate code block is not generated. Accordingly, the second command sequence cs2 is the same as the first command sequence cs1.

The part (c) of FIG. 1 illustrates a method in which the RAID controller generates stripes composed of write commands and stripes composed of cache barrier commands, and transfers the stripes to respective disks constituting the RAID according to an embodiment of the present disclosure.

First, the RAID controller constructs a first stripe F_Stripe 1 composed of write(a), write(b), write(c), and write(d). Now, the first stripe is transferred to the disks constituting the RAID in a first time slot Time slot1.

Next, in order to ensure a write order between blocks according to the cache barrier command represented by 'c1' in the part (b) of FIG. 1, the RAID controller constructs a second cache barrier stripe CB_Stripe 2 composed of the same number of cache barrier commands as the number of disks constituting the RAID. Now, the second cache barrier stripe is transferred to the respective disks constituting the RAID in a second time slot Time slot2.

Next, the RAID controller constructs a third stripe F_Stripe 3 composed of write(e), write(f), write(g), and write(h). Now, the third stripe is transferred to the disks constituting the RAID in a third time slot Time slot3.

Next, the RAID controller constructs a fourth stripe F_Stripe 4 composed of write(i), write(j), write(k), and write(1). Now, the fourth stripe is transferred to the disks constituting the RAID in a fourth time slot Time slot4.

In this way, it can be seen that the write order between data blocks intended by the cache barrier command c1 included in the first command sequence cs1 is satisfied for each of all the disks constituting the RAID.

Figure 2A:
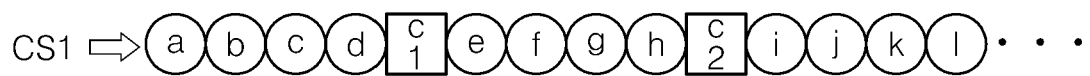
FIG. 2A, FIG. 2B, and FIG. 2C are diagrams illustrating a concept of a method of operating a RAID controller according to another embodiment of the present disclosure.
Figure 2B:
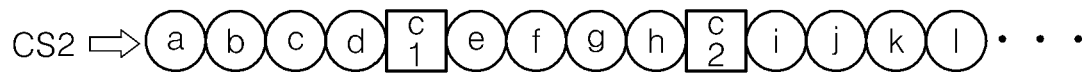
Figure 2C:
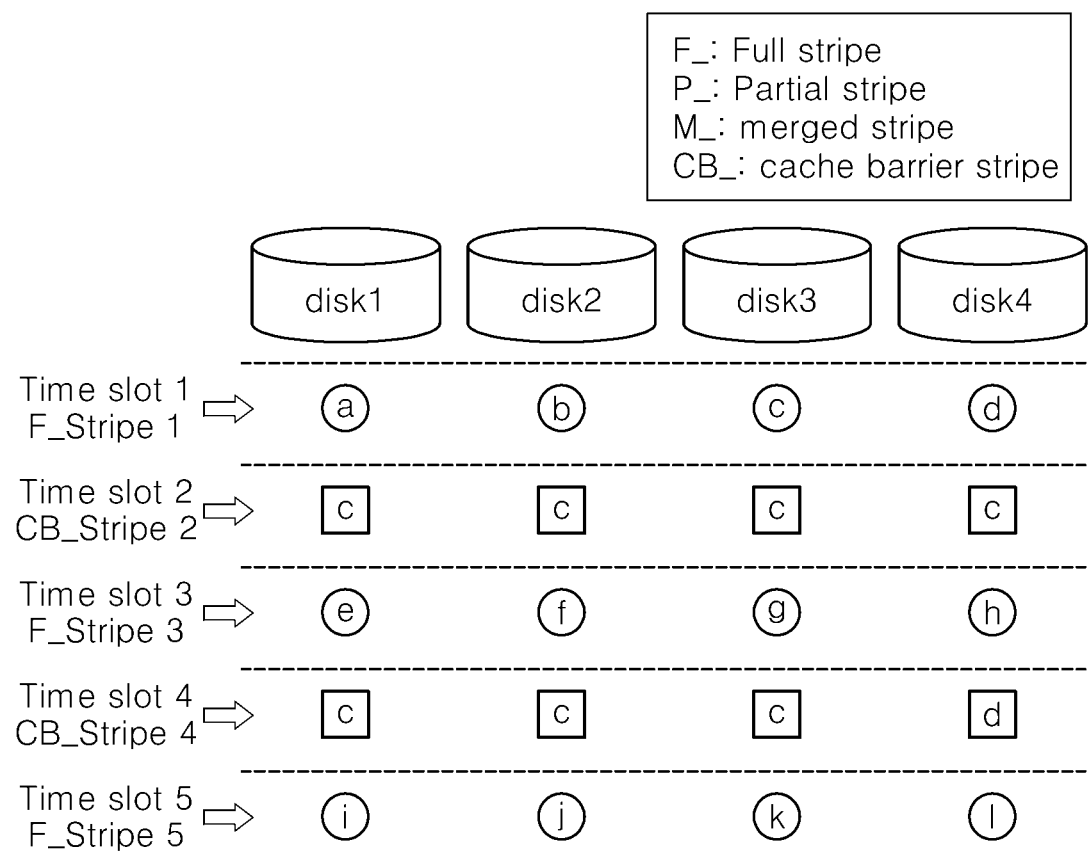

FIG. 2 is a diagram illustrating a concept of a method of operating a RAID controller according to another embodiment of the present disclosure.

The first command sequence cs1 of the part (a) of FIG. 2 illustrates a series of commands transmitted from the host to the RAID controller.

The first command sequence cs1 includes two cache barrier commands c1 and c2.

The second command sequence cs2 of the part (b) of FIG. 2 is generated by reconstructing the first command sequence cs1 by the RAID controller. In FIG. 1, since RAID 0 is assumed, a separate code block is not generated. Accordingly, the second command sequence cs2 is the same as the first command sequence cs1

The part (c) of FIG. 2 illustrates a method in which the RAID controller generates stripes composed of write commands and stripes composed of cache barrier commands and transfers the stripes to respective disks constituting the RAID according to an embodiment of the present disclosure.

First, the RAID controller constructs a first stripe F_Stripe 1 composed of write(a), write(b), write(c), and write(d). Now, the first stripe is transferred to the disks constituting the RAID in a first time slot Time slot1.

Next, in order to ensure the write order between blocks according to the cache barrier command represented by 'c1' in the part (b) of FIG. 2, the RAID controller constructs a second cache barrier stripe CB_Stripe 2 composed of the same number of cache barrier commands as the number of disks constituting the RAID. Now, the second cache barrier stripe is transferred to the respective disks constituting the RAID in a second time slot Time slot2.

Next, the RAID controller constructs a third stripe F_Stripe 3 composed of write(e), write(f), write(g), and write(h). Now, the third stripe is transferred to the disks constituting the RAID in a third time slot Time slot3.

Next, in order to ensure the write order between blocks according to the cache barrier command represented by 'c2' in the part (b) of FIG. 2, the RAID controller constructs a fourth cache barrier stripe CB_Stripe 4 composed of the same number of cache barrier commands as the number of disks constituting the RAID. Now, the fourth cache barrier stripe is transferred to the respective disks constituting the RAID in a fourth time slot Time slot4.

Next, the RAID controller constructs a fifth stripe F_Stripe 5 composed of write(i), write(j), write(k), and write(1). Now, the fifth stripe is transferred to the disks constituting the RAID in a fifth time slot Time slot5.

In this way, it can be seen that the write order between data blocks intended by the cache barrier commands c1 and c2 included in the first command sequence cs1 is satisfied for each of all the disks constituting the RAID.

Figure 3A:
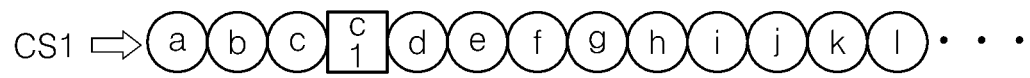
FIG. 3A, FIG. 3B and FIG. 3C are diagrams illustrating a concept of a method of operating a RAID controller according to still another embodiment of the present disclosure.
Figure 3B:
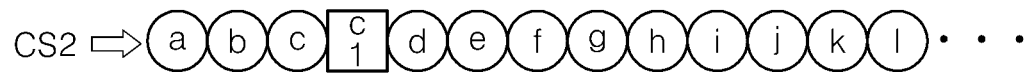
Figure 3C:
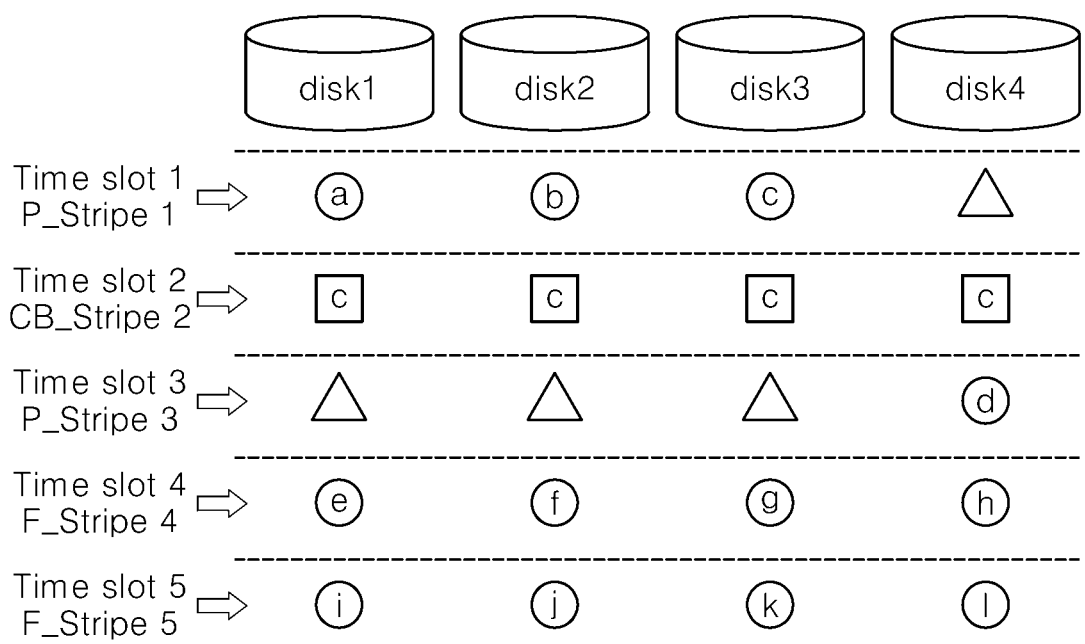

FIG. 3 is a diagram illustrating a concept of a method of operating a RAID controller according to another embodiment of the present disclosure.

A first command sequence cs1 of the part (a) of FIG. 3 illustrates a series of commands transmitted from the host to the RAID controller. The first command sequence cs1 includes one cache barrier command c1.

A second command sequence cs2 of the part (b) of FIG. 3 is generated by reconstructing the first command sequence cs1 by the RAID controller. In FIG. 1, since RAID 0 is assumed, a separate code block is not generated. Accordingly, the second command sequence cs2 is the same as the first command sequence cs1.

The part (c) of FIG. 3 illustrates a method in which the RAID controller generates stripes composed of write commands and stripes composed of cache barrier commands, and transfers the stripes to respective disks constituting the RAID according to an embodiment of the present disclosure.

First, the RAID controller constructs a first stripe P_Stripe 1 composed of write(a), write(b), write(c), and null. Now, the first stripe is transferred to the disks constituting the RAID in a first time slot Time slot1.

In this embodiment, if a cache barrier command is found in a process of collecting the same number of write commands as the number of disks constituting the RAID, the RAID controller constructs a stripe using only the write commands that exist before the cache barrier command. In this case, if the number of write commands included in the stripe is smaller than the number of disks constituting the RAID, an empty space occurs in the stripe. This empty space can be filled with a null command, for example. The null command may mean that no command is sent to the disk corresponding to the null command.

In the figures of this specification, the null command is represented by a triangle.

In the example of FIG. 3, the number of write commands included in the first stripe P_Stripe 1 is three, which is less than four which is the number of disks constituting the RAID. Accordingly, one empty space occurs in the stripe. It may be considered that there is a null command in the empty space of the first stripe P_Stripe 1.

As such, a stripe including a number of write commands smaller than the total number of disks constituting the RAID may be referred to as a partial stripe in the present disclosure.

Next, in order to ensure the write order between blocks according to the cache barrier command represented by 'c1' in the part (b) of FIG. 3, the RAID controller constructs a second cache barrier stripe CB_Stripe 2 composed of the same number of cache barrier commands as the number of disks constituting the RAID. Now, the second cache barrier stripe is transferred to the respective disks constituting the RAID in a second time slot Time slot2.

Next, the RAID controller constructs a third stripe P_Stripe 3 composed of null, null, null, and write(d). Now, the third stripe is transferred to the disks constituting the RAID in a third time slot Time slot3. The third stripe P_Stripe 3 is included in the classification of partial stripe described above.

Next, the RAID controller constructs a fourth stripe F_Stripe 4 composed of write(e), write(f), write(g), and write(h). Now, the fourth stripe is transferred to the disks constituting the RAID in a fourth time slot Time slot4. As such, a stripe including the same number of write commands as the total number of disks constituting the RAID may be referred to as a full stripe in the present disclosure. The full stripe is distinguished from a merged stripe described later.

Next, the RAID controller constructs a fifth stripe F_Stripe 5 composed of write(i), write(j), write(k), and write(l). Now, the fifth stripe is transferred to the disks constituting the RAID in a fifth time slot Time slot5.

In this way, it can be seen that the write order between data blocks intended by the cache barrier command c1 included in the first command sequence cs1 is satisfied for each of all the disks constituting the RAID.

Figure 4A:
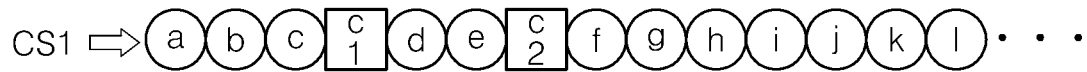
FIG. 4A, FIG. 4B and FIG. 4C are diagrams illustrating a concept of a method of operating a RAID controller according to still another embodiment of the present disclosure.
Figure 4B:
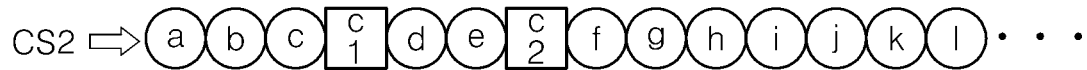
Figure 4C:
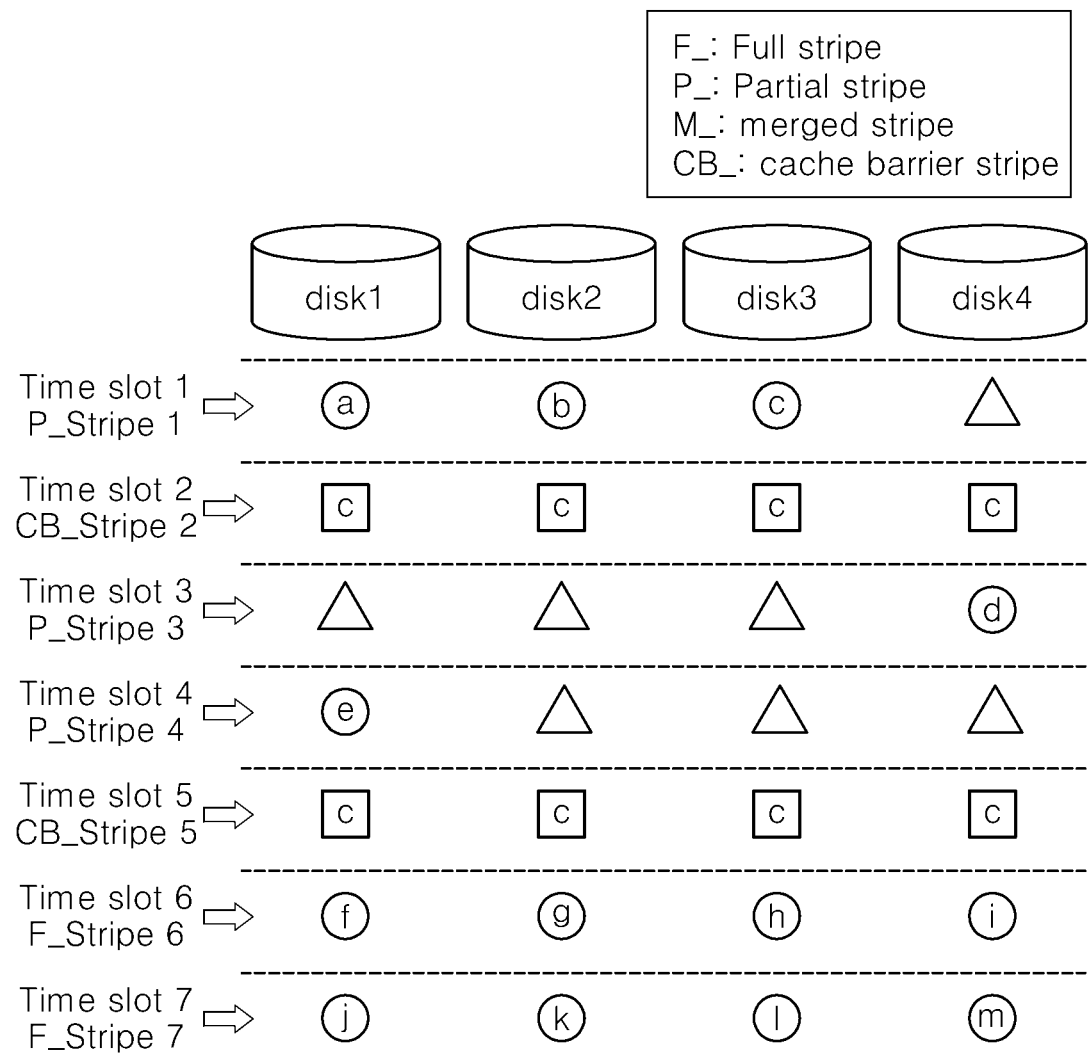

FIG. 4 is a diagram illustrating a concept of a method of operating a RAID controller according to another embodiment of the present disclosure.

A first command sequence cs1 of the part (a) of FIG. 4 illustrates a series of commands transferred from the host to the RAID controller.

The first command sequence cs1 includes two cache barrier commands c1 and c2.

The second command sequence cs2 of the part (b) of FIG. 4 is generated by reconstructing the first command sequence cs1 by the RAID controller. In FIG. 1, since RAID 0 is assumed, a separate code block is not generated. Accordingly, the second command sequence cs2 is the same as the first command sequence cs1.

The part (c) of FIG. 3 illustrates a method in which the RAID controller generates stripes composed of write commands and stripes composed of cache barrier commands, and transfers the stripes to respective disks constituting the RAID according to an embodiment of the present disclosure.

First, the RAID controller constructs a first stripe P_Stripe 1 composed of write(a), write(b), write(c), and null. Now, the first stripe is transferred to the disks constituting the RAID in a first time slot Time slot1. The first stripe P_Stripe 1 is the partial stripe described above.

Next, in order to ensure the write order between blocks according to the cache barrier command represented by 'c1' in the part (b) of FIG. 4, the RAID controller constructs a second cache barrier stripe CB_Stripe 2 composed of the same number of cache barrier commands as the number of disks constituting the RAID. Now, the second cache barrier stripe is transferred to the respective disks constituting the RAID in a second time slot Time slot2.

Next, the RAID controller constructs a third stripe P_Stripe 3 composed of null, null, null, and write(d). Now, the third stripe is transferred to the disks constituting the RAID in a third time slot Time slot3. The third stripe P_Stripe 3 is the partial stripe described above.

Next, the RAID controller constructs a fourth stripe P_Stripe 4 composed of write(e), null, null, and null. Now, the fourth stripe is transferred to the disks constituting the RAID in a fourth time slot Time slot4. The fourth stripe P_Stripe 4 is the partial stripe described above.

The reason why the fourth stripe P_Stripe 4 is composed of the partial stripe is as follows. That is, after the RAID controller transmits the third stripe P_Stripe 3 to the disks, the RAID controller will try to construct a new stripe including new write commands again. In this case, the RAID controller finds a new cache barrier command c2 in the process of collecting the same number of write commands as the number of disks constituting the RAID. Accordingly, in this case, in the embodiment of the present disclosure, a stripe is constructed using only the write commands existing before the cache barrier command c2. In this case, if the number of write commands included in the stripe is smaller than the number of disks constituting the RAID, an empty space occurs in the stripe. This empty space is filled with a null command, for example. In the embodiment of FIG. 4, the number of write commands write(e) included in the fourth stripe P_Stripe 4 is one, which is less than four which is the number of disks constituting the RAID. Accordingly, three empty spaces occur in the fourth stripe P_Stripe 4. It can be considered that there are null commands in these three empty spaces.

Next, in order to ensure the write order between blocks according to the cache barrier command represented by 'c2' in the part (b) of FIG. 4, the RAID controller constructs a fifth cache barrier stripe CB_Stripe 5 composed of the same number of cache barrier commands as the number of disks constituting the RAID. Now, the fifth cache barrier stripe is transferred to the respective disks constituting the RAID in a fifth time slot Time slot5.

Next, the RAID controller constructs a sixth stripe F_Stripe 6 composed of write(f), write(g), write(h), and write(i). Now, the sixth stripe is transferred to the disks constituting the RAID in a sixth time slot Time sloth. The sixth stripe F_Stripe 6 is the full stripe described above.

Next, the RAID controller constructs a seventh stripe F_Stripe 7 composed of write(j), write(k), write(1), and write(m). Now, the seventh stripe is transferred to the disks constituting the RAID in a seventh time slot Time slot7. Here, 'm' of write(m) indicates block m to be written after block 1.

In this way, it can be seen that the write order between data blocks intended by the cache barrier commands c1 and c2 included in the first command sequence cs1 is satisfied for each of all the disks constituting the RAID.

Figure 5A:
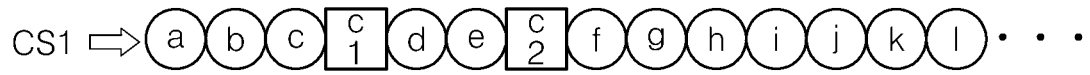
FIG. 5A, FIG. 5B and FIG. 5C are diagrams illustrating ae concept of a method of operating a RAID controller according to still another embodiment of the present disclosure.
Figure 5B:
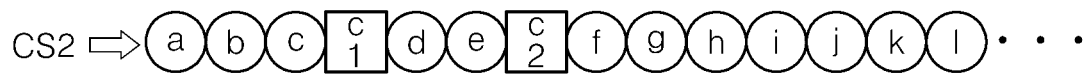
Figure 5C:
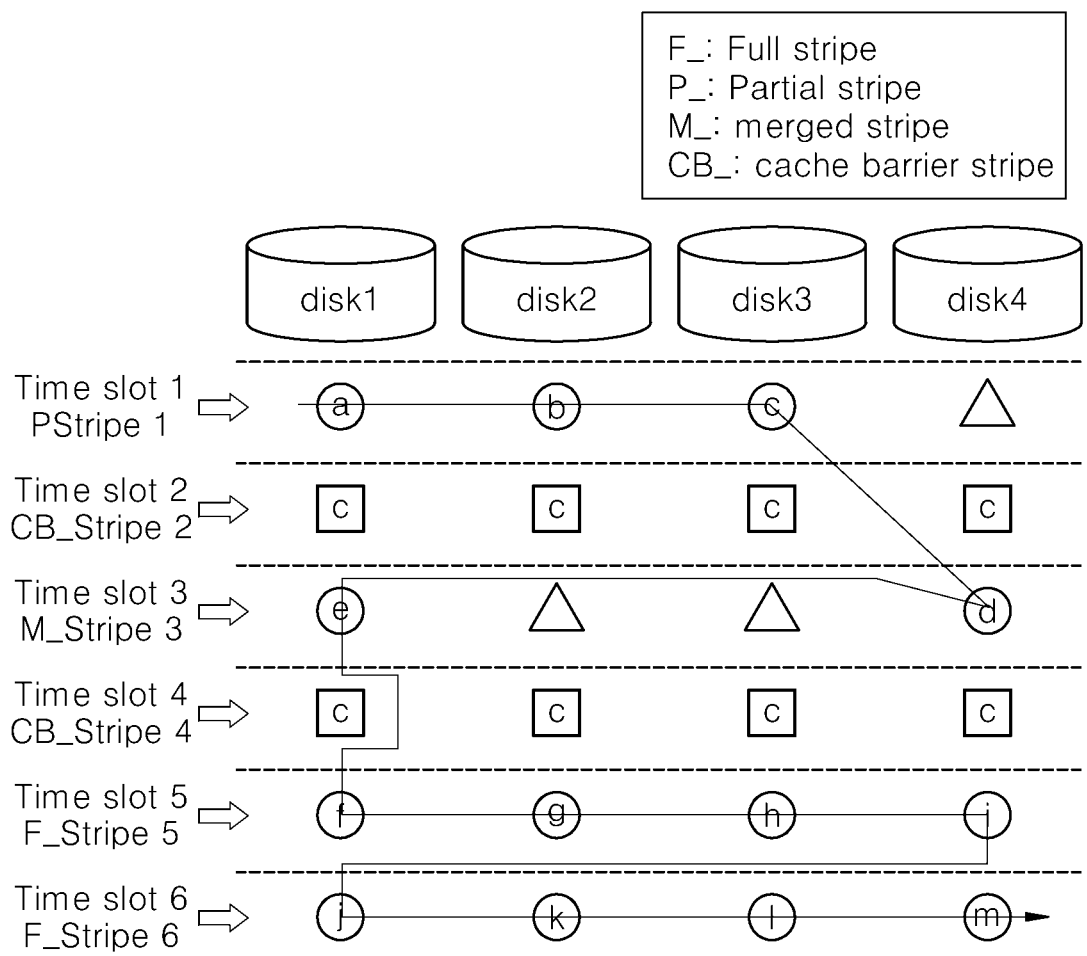

FIG. 5 is a diagram illustrating a concept of a method of operating a RAID controller according to another embodiment of the present disclosure.

In FIG. 5 which is an embodiment modified from FIG. 4, a concept of the merged stripe defined in the present disclosure is presented. One merged stripe is a stripe generated by summing two consecutive partial stripes into one.

The first command sequence cs1 in the part (a) of FIG. 5 illustrates a series of commands transmitted from the host to the RAID controller.

The first command sequence cs1 includes two cache barrier commands c1 and c2.

The second command sequence cs2 of the part (b) of FIG. 5 is generated by reconstructing the first command sequence cs1 by the RAID controller. In FIG. 1, since RAID 0 is assumed, a separate code block is not generated. Accordingly, the second command sequence cs2 is the same as the first command sequence cs1.

The part (c) of FIG. 5 illustrates a method in which the RAID controller generates stripes composed of write commands and stripes composed of cache barrier commands and transfers the stripes to respective disks constituting the RAID according to an embodiment of the present disclosure.

First, the RAID controller constructs a first stripe P_Stripe 1 composed of write(a), write(b), write(c), and null. Now, the first stripe is transferred to the disks constituting the RAID in a first time slot Time slot1. The first stripe P_Stripe 1 is the partial stripe described above.

Next, in order to ensure the write order between blocks according to the cache barrier command represented by 'c1' in the part (b) of FIG. 5, the RAID controller constructs a second cache barrier stripe CB_Stripe 2 composed of the same number of cache barrier commands as the number of disks constituting the RAID. Now, the second cache barrier stripe is transferred to the respective disks constituting the RAID in a second time slot Time slot2.

Next, the RAID controller constructs a third stripe M_Stripe 3 composed of write(e), null, null, and write(d). Now, the third stripe is transferred to the disks constituting the RAID in a third time slot Time slot3.

The third stripe M_Stripe 3 is obtained by reconstructing the third stripe P_Stripe 3 illustrated in FIG. 4 and the fourth stripe P_Stripe 4 illustrated in FIG. 4 into one stripe. As such, a stripe such as the third stripe M_Stripe 3 of FIG. 5 constructed by merging two consecutive partial stripes is referred to as a merged stripe in the present disclosure.

The third stripe M_Stripe 3 of FIG. 5 is the merged stripe described above.

Next, in order to ensure the write order between blocks according to the cache barrier command represented by 'c2' in the part (b) of FIG. 5, the RAID controller constructs a fourth cache barrier stripe CB_Stripe 4 composed of the same number of cache barrier commands as the number of disks constituting the RAID. Now, the fourth cache barrier stripe is transferred to the respective disks constituting the RAID in a fourth time slot Time slot4.

Next, the RAID controller constructs a fifth stripe F_Stripe 5 composed of write(f), write(g), write(h), and write(i). Now, the fifth stripe is transferred to the disks constituting the RAID in a fifth time slot Time slot5. The fifth stripe F_Stripe 5 is the full stripe described above.

Next, the RAID controller constructs a sixth stripe F_Stripe 6 composed of write(j), write(k), write(1), and write(m). Now, the sixth stripe is transferred to the disks constituting the RAID in a sixth time slot Time sloth.

In this way, it can be seen that the write order between data blocks intended by the cache barrier commands c1 and c2 included in the first command sequence cs1 is satisfied for each of all the disks constituting the RAID.

In the part (c) of FIG. 5, in particular, the arrangement order of blocks included in the second command sequence cs2 and a correspondence relationship for each disk in each stripe are further represented by arrows. It can be easily understood that the order of the blocks appearing in the direction of progression of the arrow presented in the part (c) of FIG. 5 corresponds to the arrangement order of the blocks presented in the part (b) of FIG. 5.

Figure 6A:
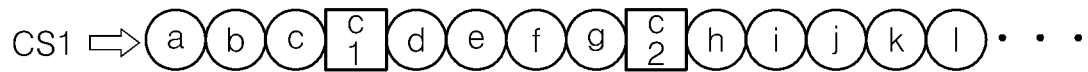
Figure 6B:
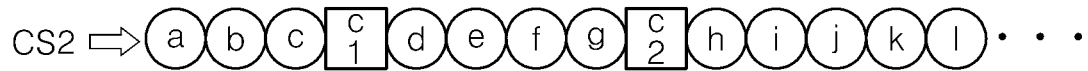
Figure 6C:
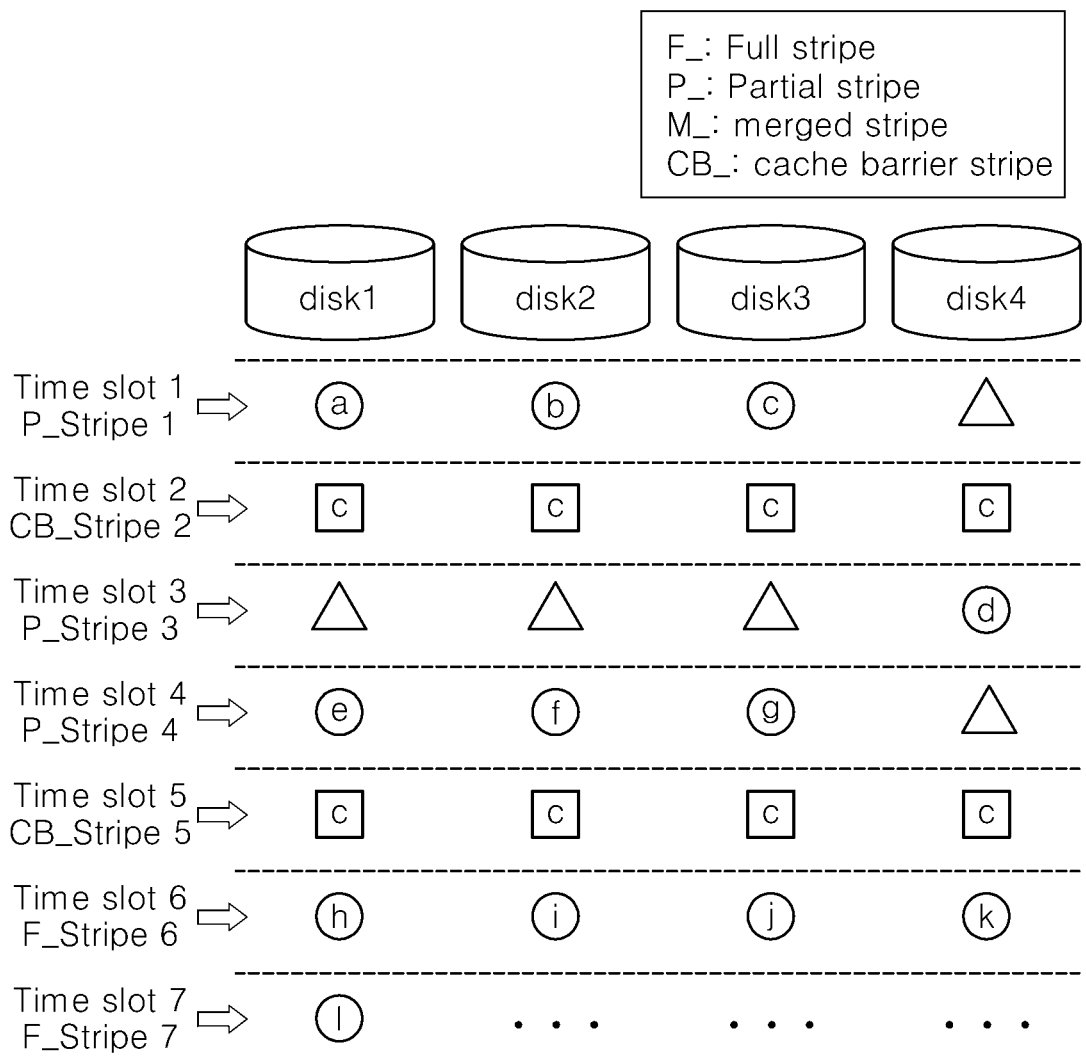
Figure 7A:
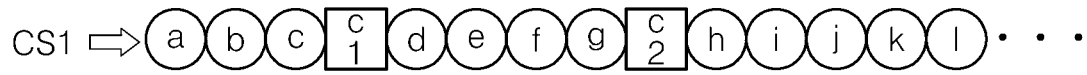
Figure 7B:
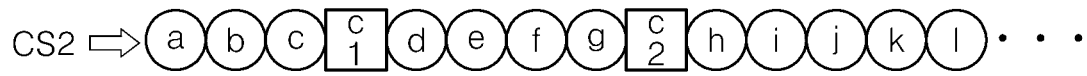
Figure 7C:
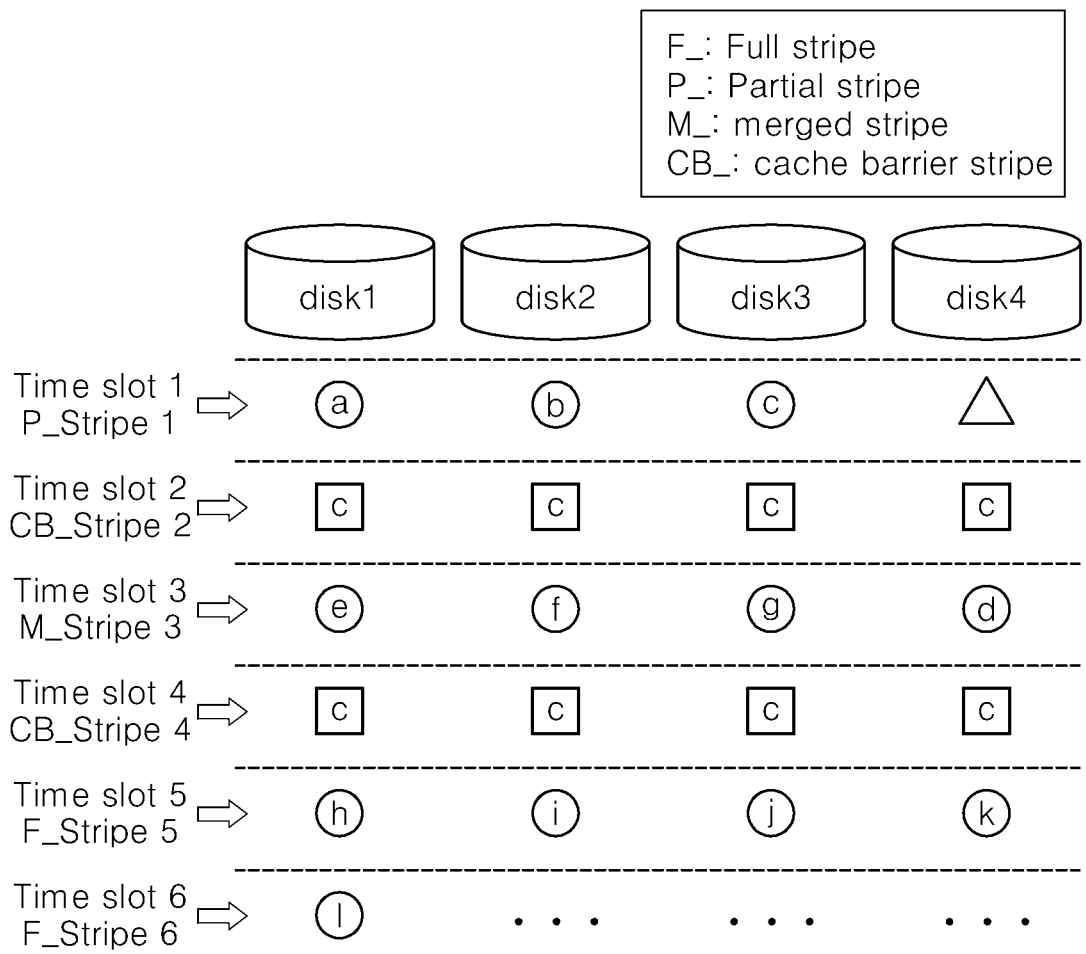

FIGS. 6 to 9 are other examples to help understand the concept of the merged stripe and the partial stripe according to an embodiment of the present disclosure. The first command sequence cs1 illustrated in the part (a) of FIG. 6 and the part (a) of FIG. 7 illustrates a series of commands transmitted from the host to the RAID controller.

The first command sequence cs1 includes two cache barrier commands c1 and c2.

The second command sequence cs2 illustrated in the part (b) of FIG. 6 and the part (b) of FIG. 7 is generated by reconfiguring the first command sequence cs1 by the RAID controller. In FIG. 1, since RAID 0 is assumed, a separate code block is not generated. Accordingly, the second command sequence cs2 is the same as the first command sequence cs1.

Figure 9A:
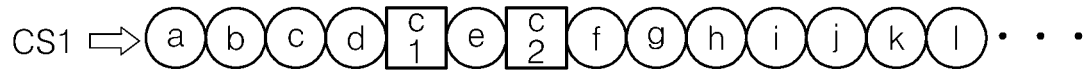
Figure 9B:
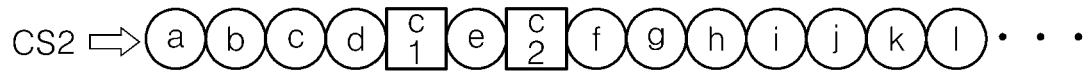
Figure 9C:
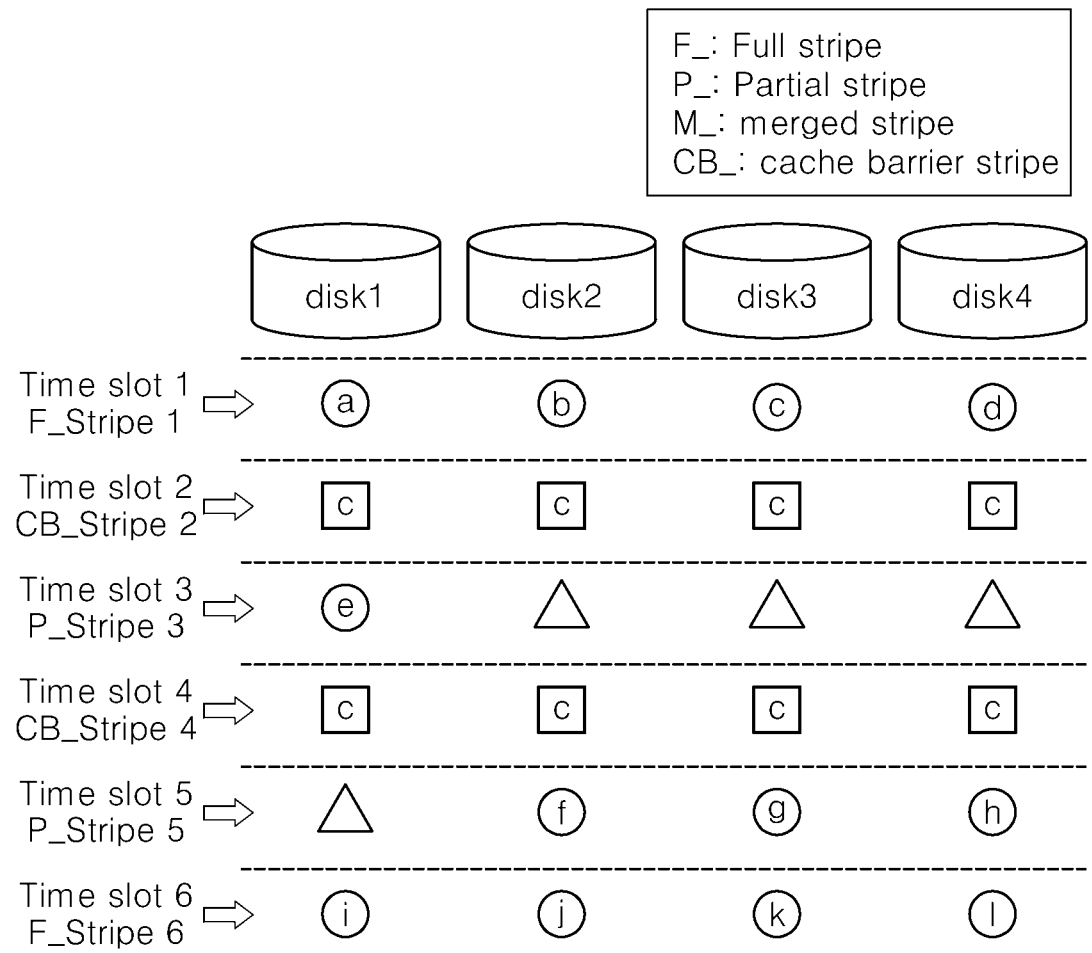

From the description of the present disclosure with respect to FIGS. 1 to 5, the contents illustrated in FIGS. 6 and 9 can be clearly understood.

FIG. 6 is an example in which the stripe P_Stripe 3 including write(d) is constructed as the partial stripe, and the stripe P_Stripe 4 including write(e), write(f), and write(g) is also constructed as the partial stripe.

FIG. 7 is an embodiment modified from FIG. 6, in which the partial stripe P_Stripe 3 of FIG. 6 and the partial stripe P_Stripe 4 of FIG. 6 are merged with each other to construct a merged stripe M_Stripe 3.

FIG. 8 is an example in which the partial stripes are constructed in succession in a third time slot3 and a fourth time slot4. In the example of FIG. 8, the sum of the number of write blocks (two write blocks) included in the third stripe P_Stripe 3 of the third timeslot and the number of write blocks (three write blocks) included in the fourth stripe P_Stripe 4 of the fourth timeslot is greater than the total number of disks constituting the RAID. Accordingly, one merged stripe cannot be reconstructed by simply combining the third stripe P_Stripe 3 and the fourth stripe P_Stripe 4.

However, in FIG. 8, if necessary, one merged stripe can be constructed by merging write(c) and write(d) of the third timeslot 3 illustrated in FIG. 8 and the write (e) and write(f) of the fourth timeslot 4 illustrated in FIG. 8. Further, write(g) of the fourth time slot Time slot4 illustrated in FIG. 8 may be independently constructed as a partial stripe. This configuration can be adopted when there is a practical benefit according to a specific embodiment.

FIG. 9 illustrates an example in which a third partial stripe P_Stripe 3 is constructed in a third time slot Time slot3, and a fourth cache barrier stripe CB_Stripe 4 is constructed in a fourth time slot Time slot4, and a fifth partial stripe P_Stripe 5 is constructed in a fifth time slot Time slot5.

Now, the characteristics of the merged stripe defined in the present disclosure will be described in detail.

First, the number of write commands included in the merged stripe illustrated in the third timeslot Time slot3 of FIG. 5 is smaller than the total number of disks constituting the RAID.

Compared to this, the number of write commands included in the merged stripe illustrated in the third timeslot Time slot3 of FIG. 7 is the same as the total number of disks constituting the RAID.

Accordingly, the number of write commands included in one merged stripe does not necessarily have to be equal to the total number of disks constituting the RAID, and does not necessarily have to be smaller than the total number.

The common characteristics of the merged stripes illustrated in FIGS. 5 and 7 are as follows.

First, in a state in which one full stripe described above is prepared, it may be assumed that a first correspondence rule in which the RAID controller allocates write commands included in the full stripe to the disks satisfies the following.

That is, for example, the write commands included in the fifth stripe F_Stripe 5, which is one full stripe presented in the fifth time slot Time slot5 of FIG. 5, are write(f), write(g), write(h), and write(i). The fifth stripe F_Stripe 5 is generated based on the second command sequence cs2 reconstructed by the RAID controller from the first command sequence cs1 as illustrated in the part (b) of FIG. 5. In this case, the order in which the write commands are arranged in the second command sequence cs2 is write(f) write(g) write(h) write(i). In this case, the write commands write(f), write(g), write(h), and write(i) included in the fifth stripe F_Stripe 5, which is a full stripe, are allocated to disk 1, disk 2, disk 3, and disk 4, respectively, according to the arrangement order in the second command sequence cs2.

However, a second correspondence rule for allocating write commands included in each merged stripe presented in FIGS. 5 and 7 to disks does not satisfy the first correspondence rule for the full stripe.

For example, in FIG. 7, four write commands constituting the merged stripe M_Stripe 3 are write(d), write(e), write(f), and write(g). In this case, as illustrated in the part (b) of FIG. 7, the order in which the write commands are arranged in the second command sequence cs2 reconstructed by the RAID controller is write(d) write(e) write(f) write(g). However, the write commands write(d), write(e), write(f), and write(g) included in the merged stripe M_Stripe 3 were allocated to disk 4, disk 1, disk 2, and disk 3, respectively. In contrast, if the stripe constructed in the third timeslot illustrated in FIG. 7 is the full stripe, the write commands write(d), write(e), write (f), and write(g) included in the full stripe would have been assigned to disk 1, disk 2, disk 3, and disk 4, respectively.

As another example, in FIG. 5, two write commands constituting the merged stripe M_Stripe 3 are write(d) and write(e). In this case, as illustrated in the part (b) of FIG. 5, the order in which the write commands are arranged in the second command sequence cs2 reconstructed by the RAID controller is write(d) write(e). Further, the write commands write(d) and write(e) included in the merged stripe M_Stripe 3 are allocated to disk 4 and disk 1, respectively.

That is, the first correspondence rule described above is a rule for allocating blocks in the order of blocks transmitted by the host to the disks, to which a plurality of order numbers are allocated, constituting the RAID. Compared to this, the second correspondence rule described above is a rule for allocating blocks in an order different from the order of blocks transmitted by the host to disks, to which a plurality of order numbers are allocated, constituting the RAID.

As described above, the merged stripe defined in the present disclosure has at least the following three characteristics.

First, the merged stripe is one obtained by reconstructing two consecutive partial stripes into one stripe.

Second, when the total number of write commands included in two consecutive partial stripes is larger than the total number of disks constituting the RAID, the two partial stripes are not simply reconstructed with one merged stripe alone.

Third, ① when there is the first correspondence rule for making the write commands included in the full stripe constructed by the RAID controller without considering the cache barrier command correspond to the disks constituting the RAID and ② when the total number of write commands included in the merged stripe constructed by the RAID controller is the same as the total number of disks constituting the RAID, or when the total number of write commands included in the merged stripe is the same as the total number of write commands included in the full stripe, ③ the second correspondence rule for making write commands included in the merged stripe correspond to the disks constituting the RAID does not satisfy the first correspondence rule.

For example, in the merged stripe M_Stripe 3 illustrated in the part (c) of FIG. 7, the write order between blocks for disks 1 to 4 is e, f, g, d, but if the blocks are written in the form of a full stripe, the order will be changed to d, e, f, g, which is the order of arrival from the host to the RAID controller.

On the other hand, according to the merged stripe M_Stripe 3 illustrated in the part (c) of FIG. 7, blocks are actually written to all disks constituting the RAID, but according to the merged stripe M_Stripe 3 illustrated in the part (c) of FIG. 5, blocks are not actually written to some of the disks (disk2, disk3) constituting the RAID. In this respect, the merged stripe M_Stripe 3 illustrated in the part (c) of FIG. 5 may be regarded as a merged stripe and still a partial stripe. In addition, compared to this, the merged stripe M_Stripe 3 illustrated in the part (c) of FIG. 7 may be regarded as a merged stripe and a kind of full stripe.

Hereinafter, a case in which the partial stripe presented in the present disclosure occurs will be described.

First, a first type of partial stripe may occur when the RAID controller finds a new cache barrier command in the process of collecting the same number of write commands as the number of disks constituting the RAID. Examples of this can be identified in the first timeslot of FIG. 3, the first timeslot of FIG. 4, the fourth timeslot of FIG. 4, the first timeslot of FIG. 6, the fourth timeslot of FIG. 6, and the fourth timeslot of FIG. 8, and the fifth timeslot of FIG. 9.

Second, a second type of partial stripe may be generated after the RAID controller consecutively generates the first type of partial stripe and one cache barrier stripe. Examples of this can be identified in the third timeslot of FIG. 3, the third timeslot of FIG. 4, the third timeslot of FIG. 6, the third timeslot of FIG. 8, and the third timeslot of FIG. 9.

Figure 10A:
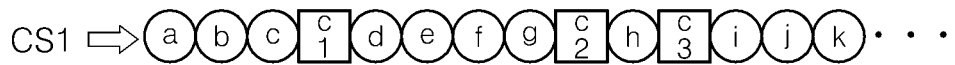
FIG. 10A, FIG. 10B and FIG. 10C are diagrams for illustrating an aspect to which the present disclosure is applied in a RAID of a type other than RAID 0.
Figure 10B:
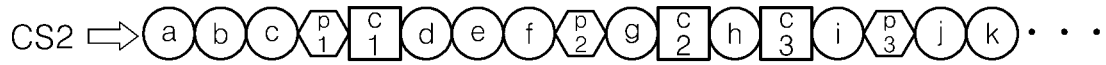
Figure 10C:
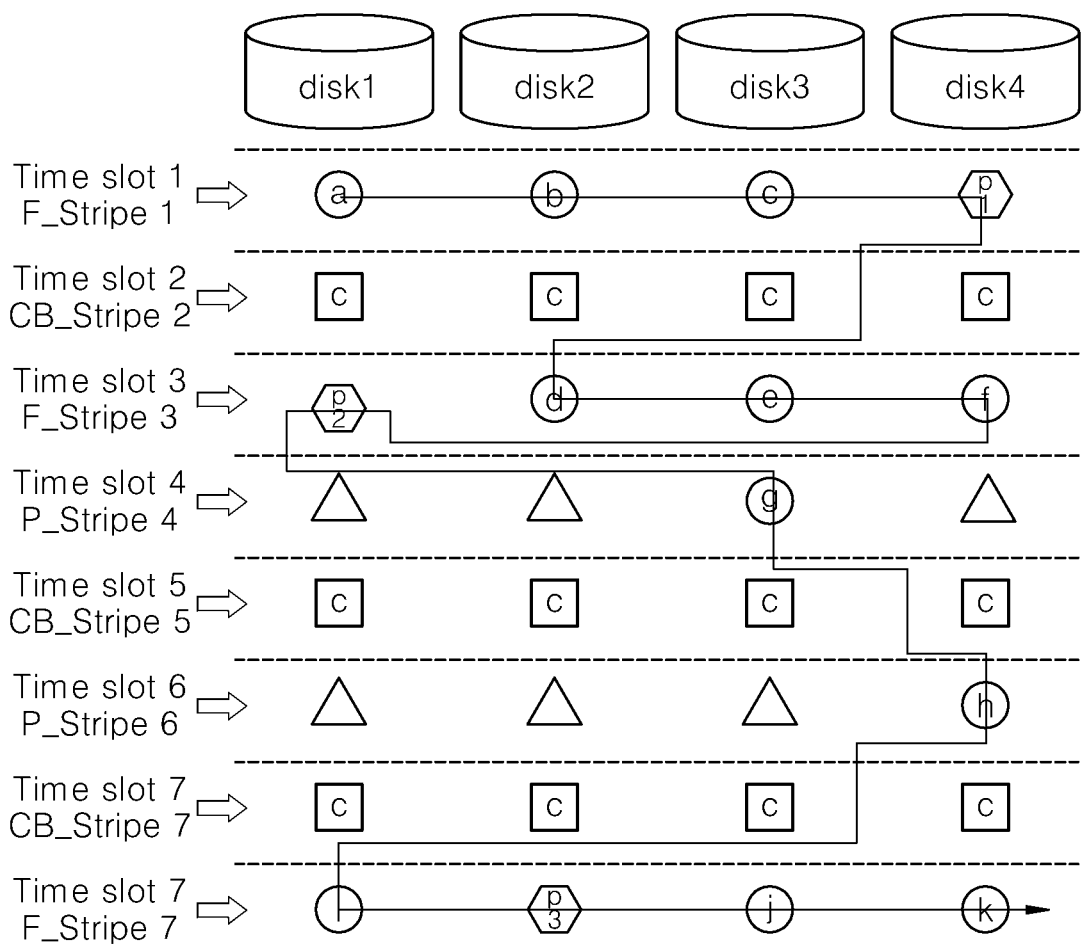

In FIG. 10 to be described later, a case in which the RAID controller consecutively generates a full stripe and one cache barrier stripe is presented. In this case, it can be identified the second type of partial stripe may not necessarily be generated immediately after the cache barrier stripe.

Meanwhile, depending on the embodiment, the second type of partial stripe and the first type of partial stripe consecutively generated after the second type of partial stripe may be reconstructed into one merged stripe.

FIG. 10 is a diagram for illustrating an aspect to which the present disclosure is applied in a RAID of a type other than RAID 0.

FIG. 10 illustrates an example of RAID 5 constituted with, for example, four disks.

A first command sequence cs1 of the part (a) of FIG. 10 illustrates a series of commands transmitted from the host to the RAID controller. The first command sequence cs1 includes three cache barrier commands c1, c2, and c3.

A second command sequence cs2 of the part (b) of FIG. 10 is generated by reconstructing the first command sequence cs1 by the RAID controller. In FIG. 10, since RAID 5 is assumed, one code block is generated for every three data blocks. Accordingly, the second command sequence cs2 is not the same as the first command sequence cs1.

When the code block can be arranged immediately before or immediately after the cache barrier command, the code block can preferably be arranged immediately before.

In the part (b) of FIG. 10, code blocks P1, P2, and P3 generated by the RAID controller are represented by hexagons.

The part (c) of FIG. 10 illustrates a method in which the RAID controller generates stripes composed of write commands and stripes composed of cache barrier commands and transfers the stripes to respective disks constituting the RAID according to an embodiment of the present disclosure.

In RAID 5, a disk allocation order of each block in the stripe including the write block is different from the disk allocation order of each block in the stripe including the write block in RAID 0. FIG. 10 is presented by reflecting this difference.

First, the RAID controller constructs a first stripe F_Stripe 1 composed of write(a), write(b), write(c), and write(P1). Now, the first stripe is transferred to the disks constituting the RAID in a first time slot Time slot1. The first stripe F_Stripe 1 is the full stripe described above.

Next, in order to ensure the write order between blocks according to the cache barrier command represented by 'c1' in the part (b) of FIG. 10, the RAID controller constructs a second cache barrier stripe CB_Stripe 2 composed of the same number of cache barrier commands as the number of disks constituting the RAID. Now, the second cache barrier stripe is transferred to the respective disks constituting the RAID in a second time slot Time slot2.

Next, the RAID controller constructs a third stripe F_Stripe 3 composed of write(d), write(e), write(f), and write(P2). Now, the third stripe is transferred to the disks constituting the RAID in a third time slot Time slot3. The third stripe F_Stripe 3 is the full stripe described above.

Next, the RAID controller constructs a fourth stripe P_Stripe 4 composed of write(g), null, null, and null. Now, the fourth stripe is transferred to the disks constituting the RAID in a fourth time slot Time slot4. The fourth stripe P_Stripe 4 is the partial stripe described above.

Next, in order to ensure the write order between blocks according to the cache barrier command represented by 'c2' in the part (b) of FIG. 10, the RAID controller constructs a fifth cache barrier stripe CB_Stripe 5 composed of the same number of cache barrier commands as the number of disks constituting the RAID. Now, the fifth cache barrier stripe is transferred to the respective disks constituting the RAID in a fifth time slot Time slot5.

Next, the RAID controller constructs a sixth stripe P_Stripe 6 composed of null, write(h), null, and null. Now, the sixth stripe is transferred to the disks constituting the RAID in a sixth time slot Time slot6. The sixth stripe P_Stripe 6 is the partial stripe described above.

Next, in order to ensure the write order between blocks according to the cache barrier command represented by 'c3' in the part (b) of FIG. 10, the RAID controller constructs a seventh cache barrier stripe CB_Stripe 7 composed of the same number of cache barrier commands as the number of disks constituting the RAID. Now, the seventh cache barrier stripe is transferred to respective disks constituting the RAID in a seventh time slot Time slot7.

Next, the RAID controller constructs an eighth stripe F_Stripe 8 composed of write(i), write(P3), write(j), and write(k). Now, the eighth stripe is transferred to the disks constituting the RAID in the eighth time slot Time slot1. The eighth stripe (F_Stripe 8) is the full stripe described above.

It can be understood that the present disclosure can be applied to various arbitrary RAIDs such as RAID 0, RAID 3, RAID 4, RAID 5, RAID 6, RAID 0+1, RAID 10, RAID 50, RAID 1E, and RAID 1.5 through the example illustrated in FIG. 10. This is because, the RAID controller can reconstruct the first command sequence cs1 provided from the host into the second command sequence cs2 according to a given RAID level in the present disclosure, and the present disclosure can be applied regardless of whether the write commands included in the second command sequence cs2 are write commands for a data block or write commands for a code block.

In the part (c) of FIG. 10, in particular, the arrangement order of blocks included in the second command sequence cs2 and the correspondence relationship of the blocks to respective disks in each stripe are further indicated by arrows. It can be easily understood that the order of the blocks appearing in the direction of progression of the arrow presented in the part (c) of FIG. 10 corresponds to the arrangement order of the blocks presented in the part (b) of FIG. 10.

Figure 11A:
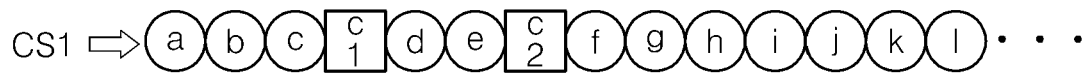
FIG. 11A, FIG. 11B and FIG. 11C are diagrams illustrating a method of generating a cache barrier stripe according to another embodiment of the present disclosure.
Figure 11B:
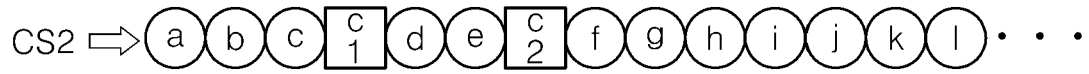
Figure 11C:
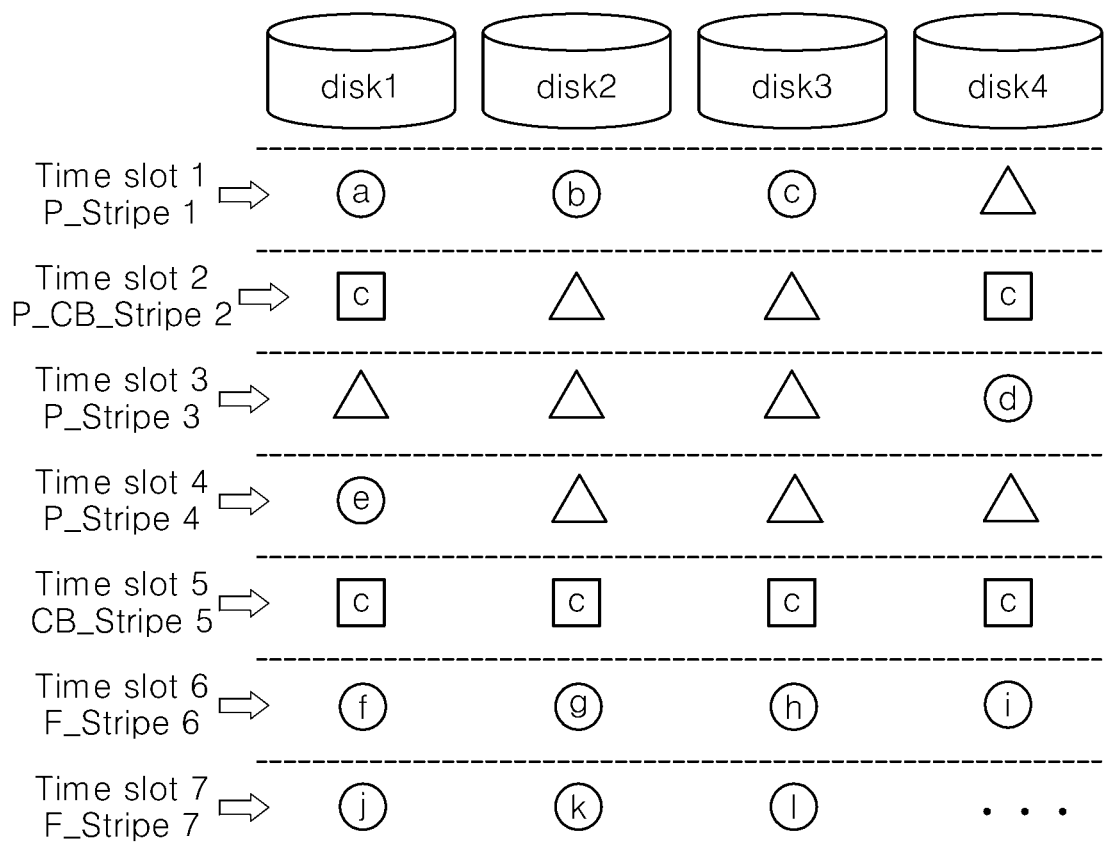

FIG. 11 is a diagram illustrating a method of generating a cache barrier stripe according to another embodiment of the present disclosure.

FIG. 11 is an embodiment modified from FIG. 4.

To explain only the difference between FIGS. 11 and 4, in the part (c) of FIG. 11, in the second cache barrier stripe P_CB_Stripe 2 constructed in the second time slot Time slot2, there is no cache barrier command for providing to some disks, that is, a second disk disk2 and a third disk disk3. That is, no command is transferred to the second disk disk2 and the third disk disk3 by the second cache barrier stripe P_CB_Stripe 2. In this specification, this type of cache barrier stripe may be referred to as a partial cache barrier stripe.

The second cache barrier stripe P_CB_Stripe 2 presented in FIG. 11 can operate effectively in a situation in which different cache barrier commands are predicted to be transferred to the second disk disk2 and the third disk disk3 by another cache barrier stripe (e.g., CB_Stripe 5), which is constructed before the second disk disk2 and the third disk disk3 are provided and after the second cache barrier stripe P_CB_Stripe 2, even if the cache barrier command is not transmitted to the second disk disk2 and the third disk disk3 by the second cache barrier stripe P_CB_Stripe 2.

Figure 12:
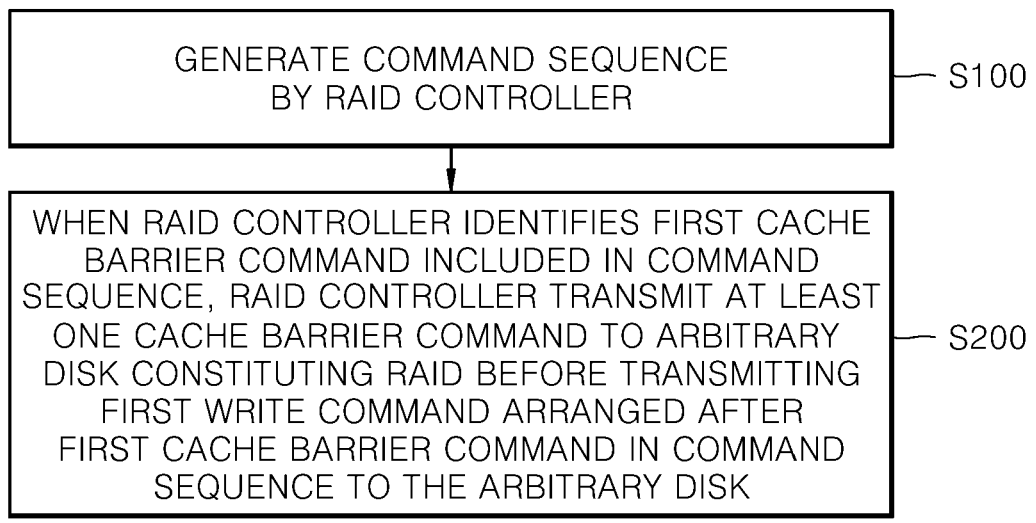
FIG. 12 is a flow chart illustrating a method of controlling a RAID controller provided according to an embodiment of the present disclosure.

FIG. 12 is a flowchart illustrating a method of controlling a RAID controller provided according to an embodiment of the present disclosure.

In step S100, the RAID controller may generate a command sequence.

In step S200, when the RAID controller has identified the first cache barrier command included in the command sequence, the RAID controller may transmit at least one cache barrier command to arbitrary disk constituting the RAID before transmitting the first write command arranged after the first cache barrier command in the command sequence to the arbitrary disk.

Figure 13:
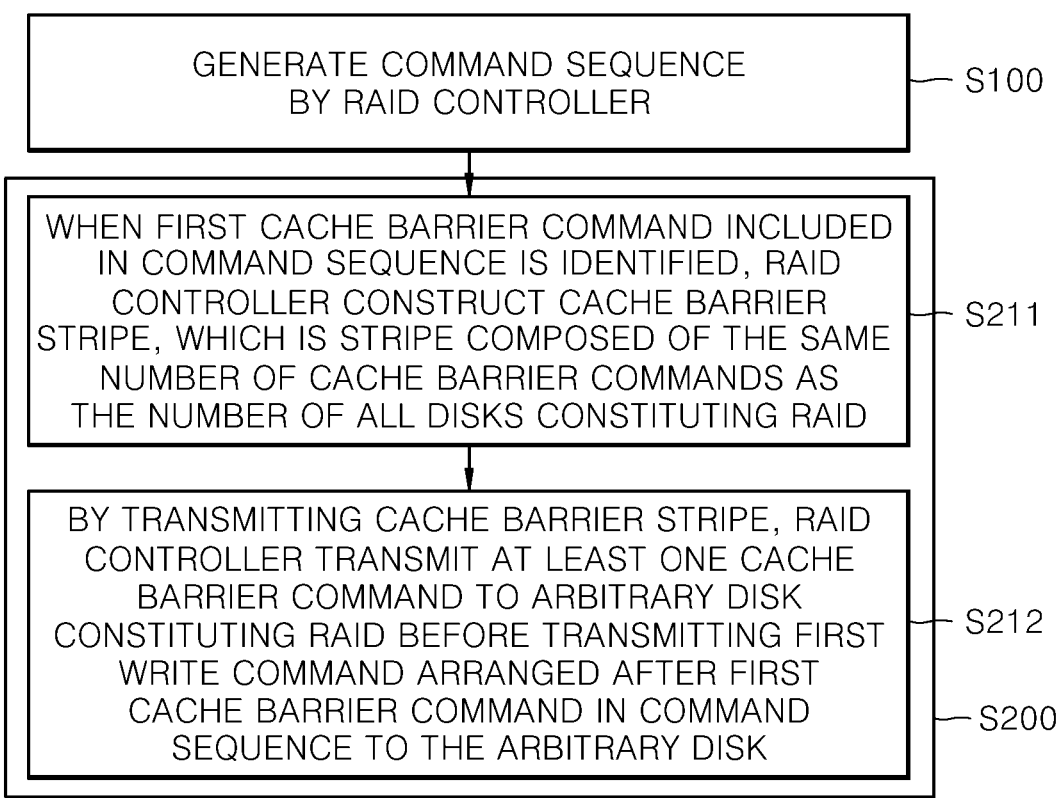
FIG. 13 is a flow chart illustrating a method of controlling a RAID controller provided according to another embodiment of the present disclosure.

FIG. 13 is a flow chart illustrating a method of controlling a RAID controller provided according to another embodiment of the present disclosure.

In step S100, the RAID controller may generate a command sequence.

In step S211, when the first cache barrier command included in the command sequence is identified, the RAID controller may construct a cache barrier stripe, which is a stripe composed of the same number of cache barrier commands as the number of all disks constituting the RAID.

In step S212, by transmitting the cache barrier stripe, the RAID controller may be transmitted at least one cache barrier command to an arbitrary disk constituting the RAID before transmitting the first write command arranged after the first cache barrier command in the command sequence to the arbitrary disk.

Figure 14:
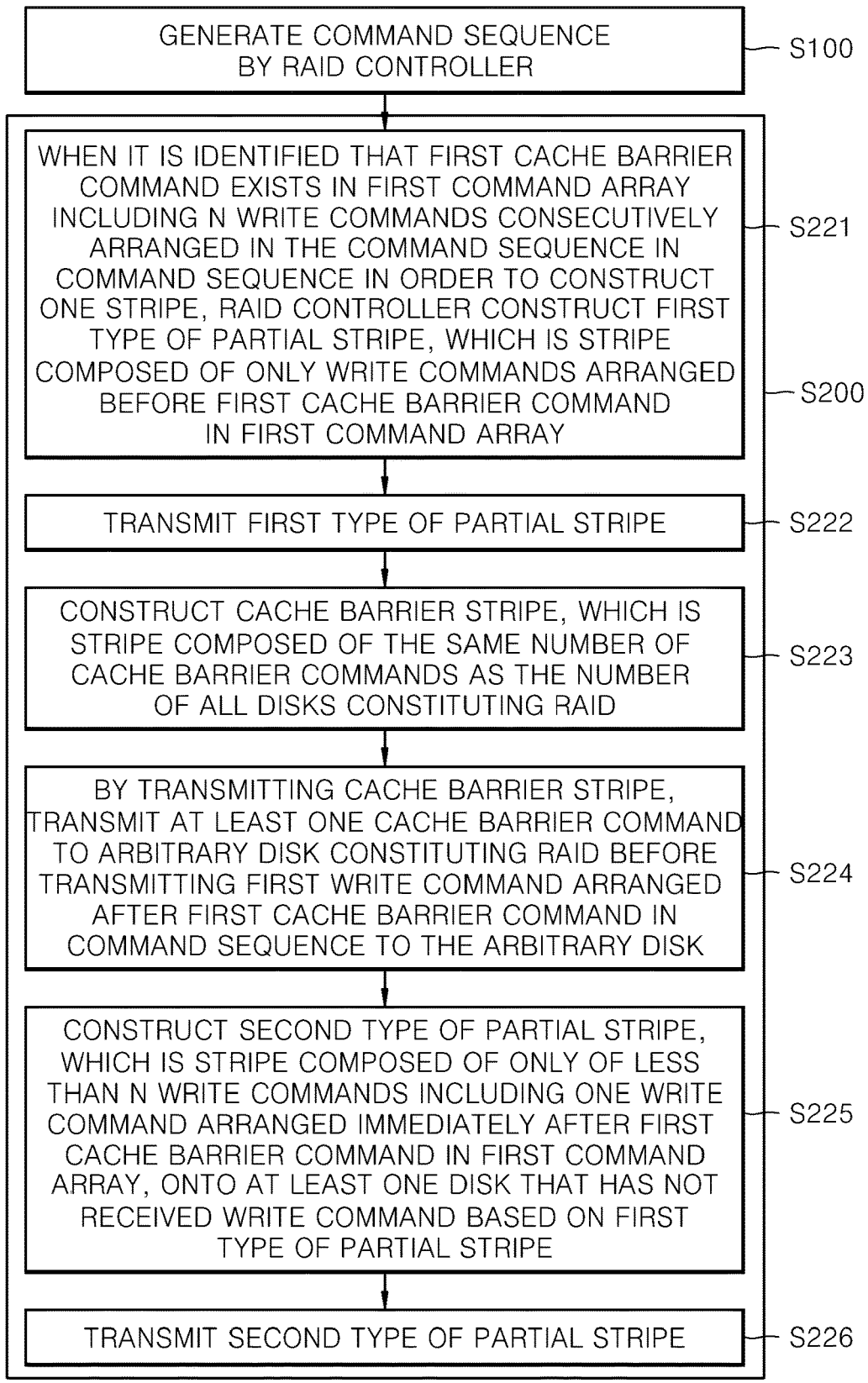
FIG. 14 is a flow chart illustrating a method of controlling a RAID controller provided according to still another embodiment of the present disclosure.

FIG. 14 is a flowchart illustrating a method of controlling a RAID controller provided according to another embodiment of the present disclosure.

In step S100, the RAID controller may generate a command sequence.

In step S221, when the RAID controller has identified that the first cache barrier command exists in a first command array including N write commands consecutively arranged in the command sequence in the process of obtaining the N write commands in order to construct one stripe in the command sequence, the RAID controller may construct a first type of partial stripe, which is a stripe composed of only the write commands arranged before the first cache barrier command in the first command array.

In step S222, the RAID controller may transmit the first type of partial stripe.

In step S223, the RAID controller may construct a cache barrier stripe, which is a stripe composed of the same number of cache barrier commands as the number of all disks constituting the RAID.

In step S224, by transmitting the cache barrier stripe, the RAID controller may transmit at least one cache barrier command to an arbitrary disk constituting the RAID before transmitting the first write command arranged after the first cache barrier command in the command sequence to the arbitrary disk.

In step S225, the RAID controller may construct a second type of partial stripe, which is a stripe composed of only of less than N write commands including one write command arranged immediately after the first cache barrier command in the first command array, onto at least one disk that has not received a write command based on the first type of partial stripe.

In step S226, the RAID controller may transmit the second type of partial stripe.

Figure 15:
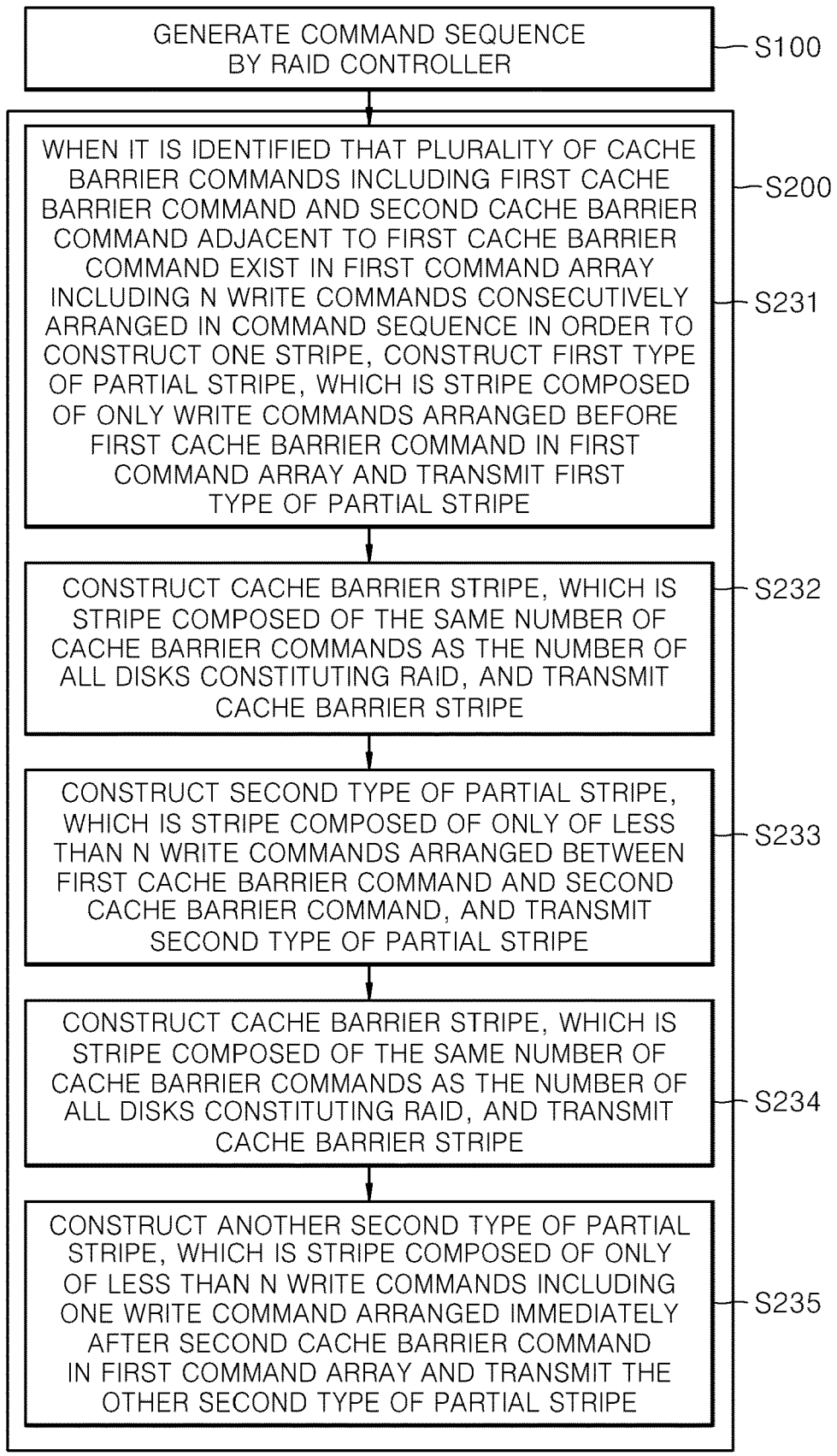
FIG. 15 is a flow chart illustrating a method of controlling a RAID controller provided according to still another embodiment of the present disclosure.

FIG. 15 is a flow chart illustrating a method of controlling a RAID controller provided according to another embodiment of the present disclosure.

In step S100, the RAID controller may generate a command sequence.

In step S231, when the RAID controller has identified that a plurality of cache barrier commands including the first cache barrier command and a second cache barrier command adjacent to the first cache barrier command exist in the first command array including N write commands consecutively arranged in the command sequence in the process of obtaining the N write commands in order to construct one stripe in the command sequence, the RAID controller may construct a first type of partial stripe, which is a stripe composed of only the write commands arranged before the first cache barrier command in the first command array, and transmit the first type of partial stripe.

In step S232, the RAID controller may construct a cache barrier stripe, which is a stripe composed of the same number of cache barrier commands as the number of all disks constituting the RAID, and transmit the cache barrier stripe.

In step S233, the RAID controller may construct a second type of partial stripe, which is a stripe composed of only of less than N write commands arranged between the first cache barrier command and the second cache barrier command, and transmit the second type of partial stripe.

In step S234, the RAID controller may construct a cache barrier stripe, which is a stripe composed of the same number of cache barrier commands as the number of all disks constituting the RAID, and transmit the cache barrier stripe.

In step S235, the RAID controller may construct another second type of partial stripe, which is a stripe composed of only of less than N write commands including one write command arranged immediately after the second cache barrier command in the first command array, and transmit the other second type of partial stripe.

Figure 16A:
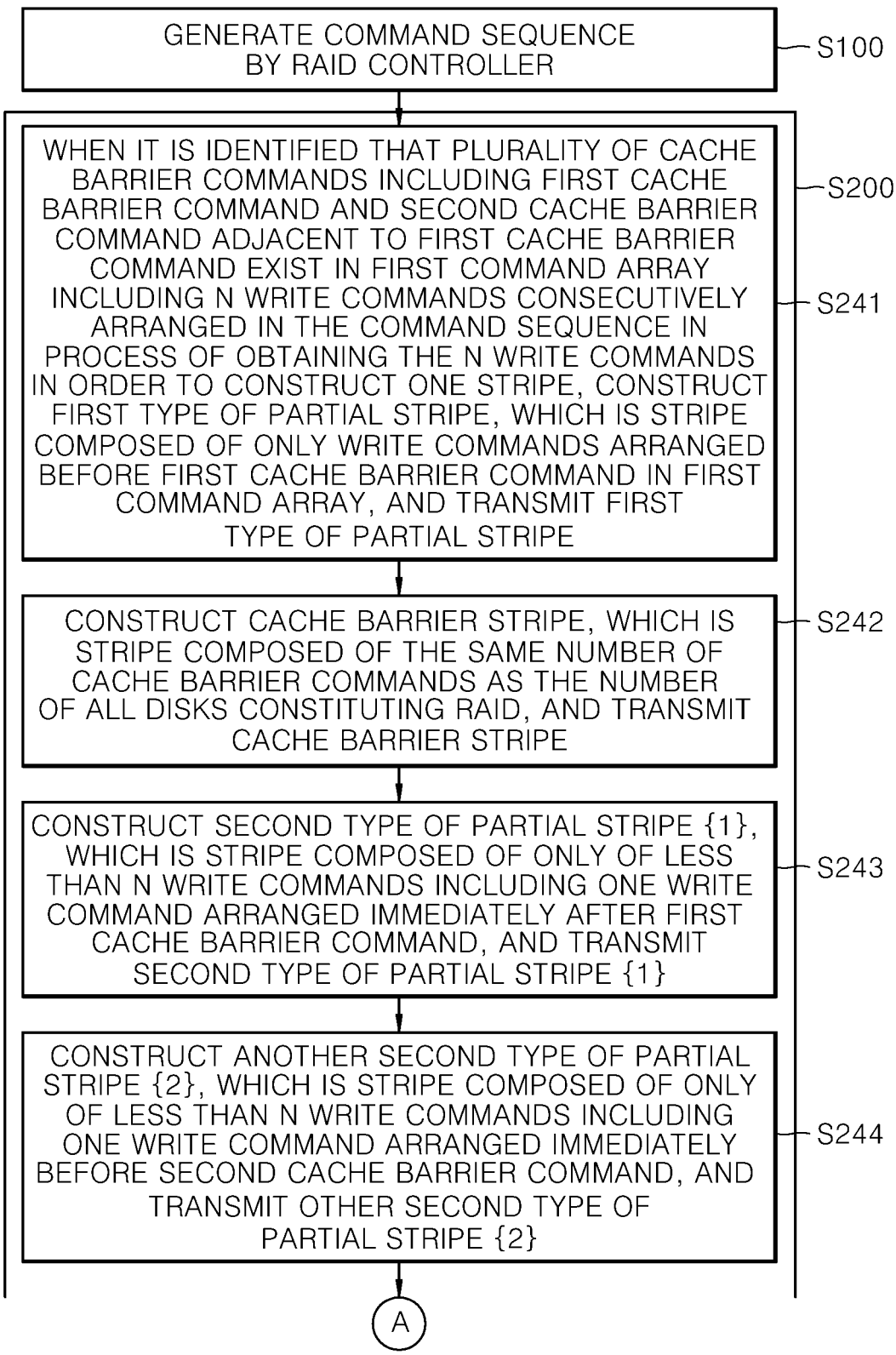
FIG. 16A and FIG. 16B show a flow chart illustrating a method of controlling a RAID controller provided according to still another embodiment of the present disclosure.
Figure 16B:
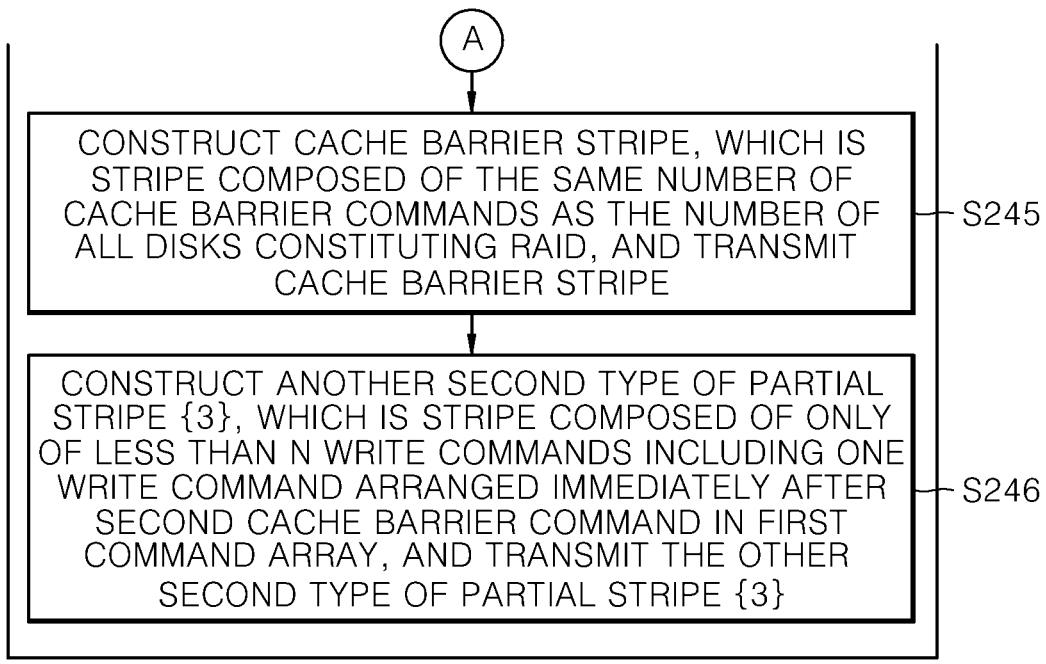

FIG. 16A and FIG. 16B show a flowchart illustrating a method of controlling a RAID controller provided according to another embodiment of the present disclosure.

In step S100, the RAID controller may generate a command sequence.

In step S241, when the RAID controller has identified that a plurality of cache barrier commands including the first cache barrier command and a second cache barrier command adjacent to the first cache barrier command exist in the first command array including N write commands consecutively arranged in the command sequence in the process of obtaining the N write commands in order to construct one stripe in the command sequence, the RAID controller may construct a first type of partial stripe, which is a stripe composed of only the write commands arranged before the first cache barrier command in the first command array, and transmit the first type of partial stripe.

In step S242, the RAID controller may construct a cache barrier stripe, which is a stripe composed of the same number of cache barrier commands as the number of all disks constituting the RAID, and transmit the cache barrier stripe.

In step S243, the RAID controller may construct a second type of partial stripe {1}, which is a stripe composed of only of less than N write commands including one write command arranged immediately after the first cache barrier command, and transmit the second type of partial stripe {1}.

In step S244, the RAID controller may construct another second type of partial stripe {2}, which is a stripe composed of only of less than N write commands including one write command arranged immediately before the second cache barrier command, and transmit the other second type of partial stripe {2}.

In step S245, the RAID controller may construct a cache barrier stripe, which is a stripe composed of the same number of cache barrier commands as the number of all disks constituting the RAID, and transmit the cache barrier stripe.

In step S246, the RAID controller may construct another second type of partial stripe {3}, which is a stripe composed of only of less than N write commands including one write command arranged immediately after the second cache barrier command in the first command array, and transmit the other second type of partial stripe {3}.

The second type of partial stripe{1}, the second type of partial stripe{2}, and the second type of partial stripe{3} presented in steps S243, S244, and S246 are different partial stripes.

Figure 17:
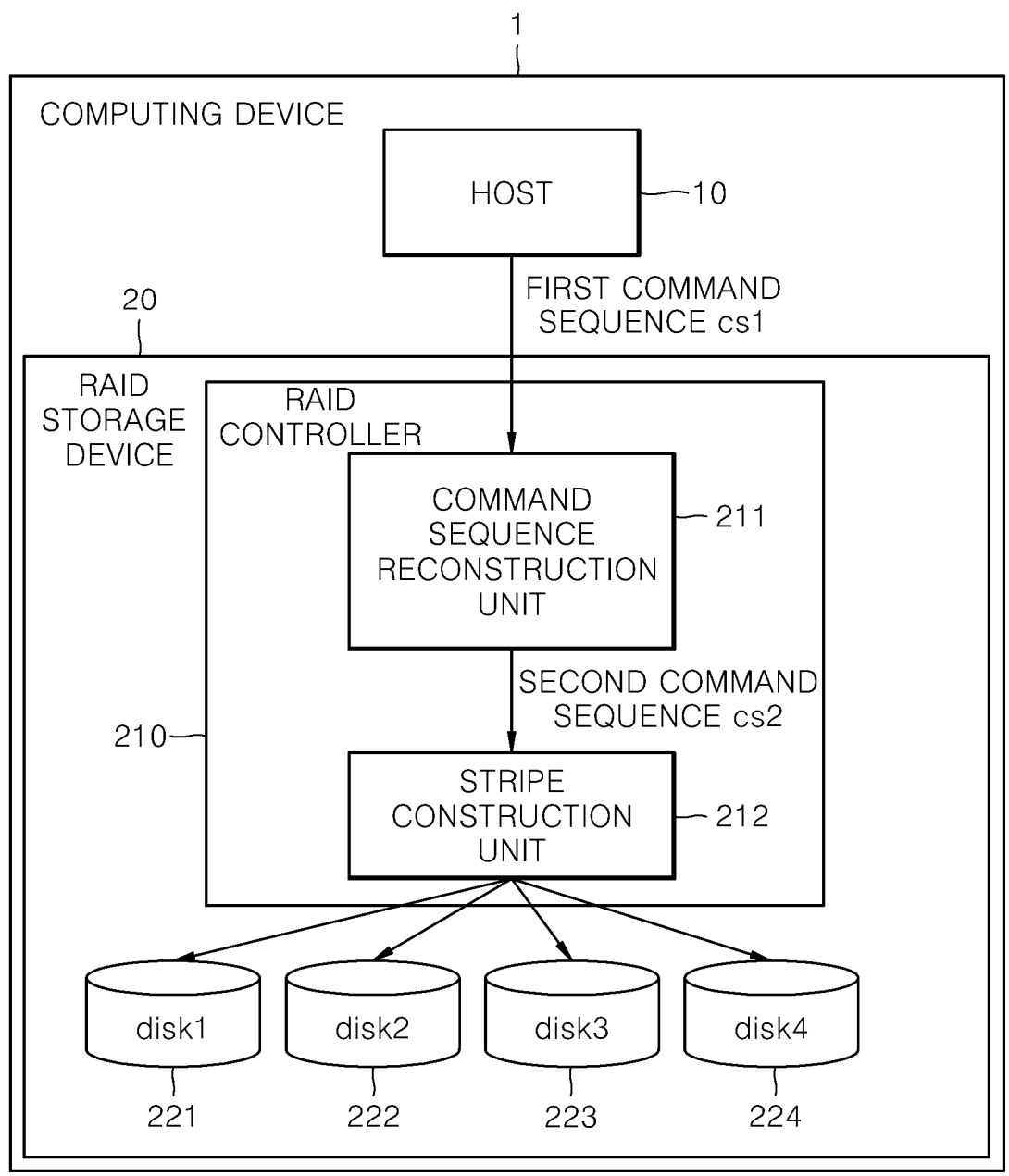
FIG. 17 is a diagram illustrating a configuration of a computing device provided according to an embodiment of the present disclosure.

FIG. 17 is a diagram illustrating a configuration of a computing device provided according to an embodiment of the present disclosure.

A computing device 1 may include a host 10 and a RAID storage device 20.

The RAID storage device 20 may include a RAID controller 210 and a plurality of disks 221, 222, 223 and 224.

The RAID controller 210 may include a command sequence reconstruction unit 211 and a stripe construction unit 212.

The host 10 may transmit the first command sequence cs1 to the RAID controller 210.

The command sequence reconstruction unit 211 may generate the reconstructed second command sequence cs2 by reconstructing the first command sequence cs1 according to a given RAID policy.

The stripe construction unit 212 may generate a stripe from the second command sequence cs2.

The command according to the generated stripe may be transferred to each of the disks 221, 222, 223, and 224.

The RAID controller 210 may be adapted to, when the first cache barrier command included in the second command sequence cs2 used to generate is identified, transmit at least one cache barrier command to an arbitrary disk 221, 222, 223, or 224 constituting the RAID before transmitting the first write command arranged after the first cache barrier command in the second command sequence cs2 to the arbitrary disk 221, 222, 223, or 224.

Further, a nonvolatile storage medium that can be read by the RAID controller 210 may be provided according to an embodiment of the present disclosure. In the nonvolatile storage medium, a command set that causes, when the first cache barrier command included in the second command sequence cs2 used to generate the stripe is identified, the RAID controller 210 to perform transmitting at least one cache barrier command to an arbitrary disk 221, 222, 223, or 224 constituting the RAID before transmitting the first write command arranged after the first cache barrier command in the second command sequence cs2 to the arbitrary disk 221, 222, 223, or 224 may be recorded.

The nonvolatile storage medium may be, for example, a storage device such as a ROM or flash memory attached to the RAID storage device 20. Alternatively, the nonvolatile storage medium may be a portable memory such as USB. Further, the nonvolatile storage medium may be a device such as an HDD or SSD accessed by a server to which the computing device 1 is accessible.

According to the present disclosure, when a RAID controller receives a plurality of write commands including a cache barrier command in the middle, a write order to be maintained by the cache barrier command in all disks constituting the RAID can be ensured.

By using the embodiments of the present disclosure described above, those belonging to the technical field of the present disclosure may be able to easily implement various changes and modifications within the scope not departing from the essential characteristics of the present disclosure. The content of each claim in the claims may be combined with other claims having no citation relationship within the range that can be understood through the present specification.

Although the method of processing a cache barrier command for a disk array and device for the same have been described with reference to the specific embodiments, they are not limited thereto. Therefore, it will be readily understood by those skilled in the art that various modifications and changes can be made thereto without departing from the spirit and scope of the present invention defined by the appended claims.

What is claimed is:

1. A method of controlling RAID controller, comprising:
generating, by the RAID controller, a command sequence; and
transmitting, by the RAID controller, when a first cache barrier command included in the command sequence is identified, at least one cache barrier command to all of disks constituting a RAID before transmitting a first write command arranged after the first cache barrier command in the command sequence to one of the disks constituting the RAID,
wherein,
the RAID controller is configured to generate a cache barrier stripe composed of cache barrier commands based on the first cache barrier command, and then transmit the cache barrier stripe to the disks constituting the RAID at a first time slot, and
the first write command arranged right after the first cache barrier command in the command sequence is transmitted to one of the disks at a second time slot right after the first time slot.

2. The method of claim 1, wherein the command sequence is generated by reconstructing a first command sequence received from an external host device by the RAID controller according to a RAID level of the RAID controller.

3. The method of claim 1, wherein the command sequence includes data blocks included in the first command sequence received by the RAID controller from the external host device and a plurality of code blocks generated based on the data blocks.

4. The method of claim 1, wherein the command sequence is received by the RAID controller from an external host device.

5. The method of claim 1, wherein the transmitting comprises constructing, by the RAID controller, the cache barrier stripe, which is a stripe composed of the same number of cache barrier commands as the number of all of the disks constituting the RAID before transmitting the first write command to the one of the disks constituting the RAID.

6. The method of claim 1, wherein a total number of the disks constituting the RAID is N (N is a natural number of 2 or more), and
before the transmitting, the method further comprises:
constructing, by the RAID controller, when it is identified that the first cache barrier command exists in a first command array including N write commands consecutively arranged in the command sequence in a process of obtaining the N write commands from the command sequence in order to construct one stripe, a first type of partial stripe which is a stripe composed of only write commands arranged before the first cache barrier command in the first command array.

7. The method of claim 6, further comprising:
after constructing the first type of partial stripe,
transmitting one or more cache barrier commands to one or more disks constituting the RAID; and
constructing a second type of partial stripe, which is a stripe composed of less than N write commands including one write command arranged immediately after the first cache barrier command in the first command army for at least one disk that has not received a write command based on the first type of partial stripe.

8. The method of claim 7, wherein the RAID controller is adapted to construct a merged stripe, which is a single stripe constructed by merging a first partial stripe of the first type or the second type and a second partial stripe of the first type or the second type, and
if the single merged stripe is not generated using the first partial stripe and the second partial stripe, the first partial stripe and the second partial stripe are consecutively provided as different stripes.

9. The method of claim 8, wherein the RAID controller is adapted to construct a full stripe, which is a stripe constructed without considering a cache barrier command,
the RAID controller is adapted to satisfy a first predetermined correspondence rule for making write commands included in the full stripe correspond to the disks constituting the RAID,
the RAID controller is adapted to, when the total number of write commands included in the merged stripe is the same as the total number of disks constituting the RAID, or when the total number of write commands included in the merged stripe is the same as the total number of write commands included in the full stripe, satisfy a second predetermined correspondence rule for making the write commands included in the merged stripe correspond to the disks constituting the RAID, and
the first correspondence rule and the second correspondence rule are different to each other.

10. The method of claim 9, wherein the first correspondence rule is a rule for allocating a plurality of first blocks according to an order of the first blocks transferred by the host device when allocating the first blocks to the disks to which order numbers are allocated, and
the second correspondence rule is a rule for allocating a plurality of second blocks in an order different from an order of the second blocks transferred by the host device when allocating the second blocks to the disks to which the order numbers are allocated.

11. The method of claim 8, wherein the merged stripe is constructed only when the sum of the number of write commands included in the first partial stripe and the number of write commands included in the second partial stripe is less than or equal to the total number of the disks constituting the RAID.

12. The method of claim 1, wherein a total number of disks constituting the RAID is N (N is a natural number of 2 or more),
before the transmitting, the method further comprises:
constructing, by the RAID controller, a stripe composed only of write commands disposed between two adjacent cache barrier commands, when it is identified that a plurality of cache barrier commands including the first cache barrier command exists in a first command array including N write commands consecutively arranged in the command sequence in a process of obtaining the N write commands from the command sequence in order to construct one stripe.

13. The method of claim 2, wherein the command sequence includes one or more parity blocks generated by the RAID controller from blocks included in the first command sequence.

* * * * *